United States Patent [19]

Moffatt et al.

[11] 3,910,885

[45] Oct. 7, 1975

[54] 4-ALKOXY NUCLEOSIDES AND INTERMEDIATES THEREFORE

[75] Inventors: John G. Moffatt; Julien P. H. Verheyden, both of Los Altos, Calif.

[73] Assignee: Syntex (U.S.A) Inc., Palo Alto, Calif.

[22] Filed: Mar. 12, 1974

[21] Appl. No.: 450,350

[52] U.S. Cl. .......................... 260/211.5 R; 424/180
[51] Int. Cl.$^2$ .................. C07H 19/06; C07H 19/00
[58] Field of Search ........................... 260/211.5 R

[56] References Cited
UNITED STATES PATENTS

| | | | |
|---|---|---|---|
| 3,585,189 | 6/1971 | Verheyden et al. | 260/211.5 R |
| 3,817,978 | 6/1974 | Jenkins et al. | 260/211.5 R |

*Primary Examiner*—Johnnie R. Brown
*Attorney, Agent, or Firm*—Gerard A. Blaufarb; William B. Walker

[57] ABSTRACT

Novel 4'-Alkoxy-β-D-ribofuranosyl, 4'-alkoxy-2'-deoxy-β-D-erythro-pentofuranosyl and 4'-alkoxy-β-D-arabinofuranoxyl nucleosides and the corresponding 4'-haloalkoxy nucleosides can be prepared from the respective 4'-alkoxy-5'-deoxy-5'-iodo-β-D-ribofuranosyl, 4'-alkoxy-2', 5'-dideoxy-5'-iodo-β-D-erythropentofuranosyl and 4'-alkoxy-5'-deoxy-5'-iodo-β-D-arabinofuranosyl nucleosides.

The novel 4'-alkoxy and 4'-haloalkoxy nucleosides are valuable pharmacological agents. For example, they are useful in regulating and controlling metabolism and for producting metabolic deficiencies in biological systems.

20 Claims, No Drawings

4-ALKOXY NUCLEOSIDES AND INTERMEDIATES THEREFORE

SUMMARY

The novel 4'-alkoxy and the corresponding 4'-haloalkoxy nucleosides of this invention can be represented by the formula:

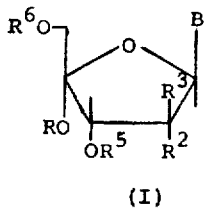

(I)

wherein:
B is a pyrimidine or purine base or a hydrolyzable acyl derivative thereof derived from a carboxylic acid having 1 to 12 carbons;
R is methyl, ethyl, $-CH_2CH_2X$, $-CH_2CHX_2$ or $-CH_2CX_3$ and each X is Cl or F;
one of $R^2$ and $R^3$ is hydrogen and the other is hydrogen or $OR^4$; and
each of $R^4$, $R^5$ and $R^6$ are hydrogen or a hydrolyzable acyl group having 1 to 12 carbons;
provided that when both $R^2$ and $R^3$ are hydrogen, B is a pyrimidine base.

The 5'-iodo nucleoside intermediates of this invention can be represented by the formulas:

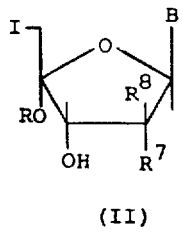

(II)

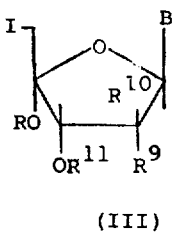

(III)

wherein
B and R are as previously described;
one of $R^7$ and $R^8$ is hydrogen, the other is hydrogen or hydroxy;
one of $R^9$ and $R^{10}$ is hydogen, the other is hydrogen or $OR^{11}$; and
$R^{11}$ is a hydrolyzable acyl group having 1 to 12 carbon atoms;
provided that when $R^7$ and $R^8$ or $R^9$ and $R^{10}$ are both hydrogen, B is a pyrimidine base.

In summary, the process of this invention for preparing the novel 4'-alkoxy and 4'-haloalkoxy nucleosides comprises:
a. treating a 5'-iodo-nucleoside selected from the group represented by the formulas:

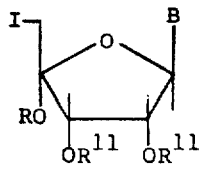

(III-A)

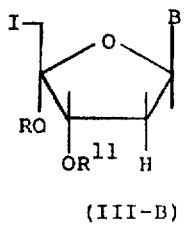

(III-B)

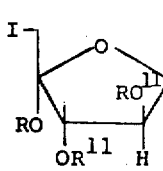

(III-C)

wherein R and $R^{11}$ are as previously defined and B is a hydrolyzable acyl derivative of a pyrimidine or purine base;
with lithium benzoate in an inert organic solvent under reactive conditions at temperatures in the range of 80° to 140°C. to obtain the corresponding 5'-benzoyloxy compound; and
b. treating said 5'-benzoyloxy compound with a base selected from concentrated ammonium hydroxide in methanol (1:1) or methanolic ammonia at temperatures in the range of 20° to 100°C. until there is formed the corresponding compound of Formula I

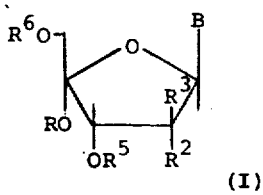

(I)

wherein R is as previously defined; B is a pyrimidine or purine base; and $OR^5$, $OR^6$ and one of $R^2$ and $R^3$ are hydroxy.

The compounds of the present invention are useful in regulating and controlling metabolism and for producing metabolic deficiencies in numerous biological systems or are intermediates for such compounds. The compounds further exhibit antibacterial and antiviral activity, central nervous system activity and cardiac and circulatory activity and correspondingly are useful in the treatment of the corresponding disorders in mammals. Moreover, the compounds of the present invention are analogs of known nucleosides having known pharmacological properties, for example, 5-alkyl-2'-deoxy-uridine is a known antibacterial agent (note: British Pat. No. 1,170,565); 6-halo-9-deaza-8-azaadenosine and 9-β-D-arabinofuranosyl adenine triester are known active antivirals (note: Japanese Pat. No. 70/25,102 and U.S. Pat. No. 3,651,045); $N^4$, $O^{2'}$ · $O^{3'}$ · $O^{5'}$ -tetraacylated cytidine is a central nervous system activator (note: German Pat. No. 2,038,807); 2-haloadenosine compounds, particularly 2-fluoroadenoise compounds, are effective in the treatment of cardiac and circulatory disorders (note: Netherlands Pat. No. 6,717,061); and the cytosine nucleosides, particularly the arabinofuranosyl derivatives, are important as antiviral and antineoplastic agents (note: Japanese Pat. No. 71/38,156 and U.S. Pat. No. 3,721,664).

The term "pyrimidine base" as used herein refers to an unsubstituted or substituted pyrimidine or 6- azapyrimidine group wherein the point of attachment to the furanose unit is through the 1-position of the pyrimidine group. The term "purine base" as used herein refers to an unsubstituted or substituted purine, 2-azapurine, 8-azapurine, 7-deazapurine or 8-aza-9-deazapurine wherein the point of attachment is through the 9-position of the purine group. Thus the term "pyrimidine and purine base" is inclusive of the nitrogen analogs, i.e., members of the 6-azapyrimidine, 2-azapurine, 8-azapurine, 7-deazapurine and 8-aza-9-deazapurine series.

More specifically the pyrimidine and purine bases include uracil-1-yl, 5-fluorouracil-1-yl, 5-alkyluracil-1-yl, 5-trifluoromethyluracil-1-yl, 5-nitrouracil-1-yl, 5-methylaminouracil-1-yl, 5-dimethylaminouracil-1-yl, 6-aza-uracil-1-yl, 6-aza-5-methyluracil-1-yl, cystosin-1-yl, 5-fluorocystosin-1-yl, 5-alkylcytosin-1-yl, 5-trifluoromethylcytosin-1-yl, 5-nitrocytosin-1-yl, 5-methylaminocytosin-1-yl, 5-dimethylaminocytosin-1-yl, 6-azacytosin-1-yl, 6-aza-5-methylcytosin-1-yl, adenin-9-yl, 2-fluoroadenin-9-yl, 2-azaadenin-9-yl, 7-deazaadenin-9-yl, 8-azaadenin-9-yl, 8-aza-9-deazaadenin-9-yl, 7-deaza-7-cyanoadenin-9-yl, N⁶-methyladenin-9-yl, N⁶-methyladenin-9-yl, N⁶-dimethyladenin-9-yl, guanin-9-yl, 8-azaguanin-9-yl, 7-deazaguanin-9-yl, isoguanin-9-yl, hypoxanthin-9-yl and xanthin-9-yl.

The terms "hydrolyzable esters," "hydrolyzable acyl derivatives" and "hydrolyzable acyloxy groups" as used herein refer to those esters and acyl derivatives conventionally employed in the nucleoside and nucleotide art, preferably those derived from carboxylic acids of 1 to 12 carbon atoms. Typical conventional hydrolyzable acyl groups include acetyl, propionyl, butyryl, valeryl, isovaleryl, hexanoyl, heptanoyl, octanoyl, nonanoyl, undecanoyl, lauroyl, benzoyl, phenylacetyl, phenylpropionyl, o-, m-, p-methylbenzoyl, β-cyclopentylpropionyl, dihydrocinnamyl, and the like.

The term "lower alkyl" as used herein, refers to a straight chain hydrocarbon group containing from 1 to 5 carbon atoms inclusive, such as methyl, n-propyl, n-butyl, and the like.

The term "aryl," as used herein, refers to a hydrocarbon group consisting of one or more aromatic rings and containing from 6 to 12 carbon atoms, inclusive, such as phenyl, benzyl, o-tolyl, m-tolyl, p-tolyl, 3,5-xylyl, pentamethylphenyl, naphthyl, and the like. The term "aralkyl" refers to a hydrocarbon group having a benzene ring or other aromatic ring and containing from 7 to 12 carbon atoms such as benzyl. The term "substituted aryl" refers to an aryl group having one or more halo, nitro, alkoxy or dialkylamino substituents in the aromatic ring such as p-chlorobenzyl, p-bromobenzyl, 2,4,6-trifluorophenyl, p-nitrophenyl, p-nitrobenzyl, p-anisyl, p-methoxybenzyl, p-dimethylaminophenyl, and the like.

DETAILED DISCUSSION

The novel nucleosides of this invention represented by Formula I can be prepared in accordance with the following reaction sequence:

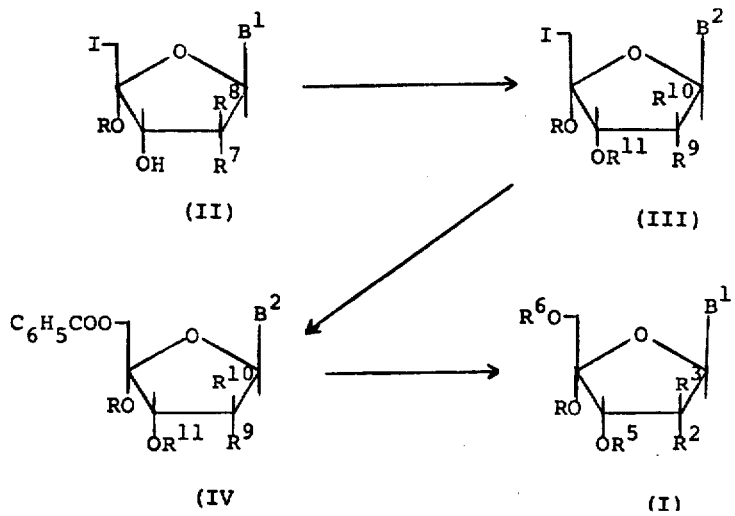

In th above sequence $R, R^2, R^3, R^5, R^6, R^7, R^8, R^9, R^{10}$ and $R^{11}$ are as previously defined; and $B^1$ represents uracil-1-yl, 5-fluorouracil-1-yl, 5-alkyluracil-1-yl, 5-trifluoromethyluracil-1-yl, 5-nitrouracil-1-yl, 5-methylaminouracil-1-yl, 5-dimethylaminouracil-1-yl, 6-azauracil-1-yl, 6-aza-5-methyluracil-1-yl, cytosin-1-yl, 5-fluorocytosin-1-yl, 5-alkylcytosin-1-yl, 5-trifluoromethylcytosin-1-yl, 5-nitrocytosin-1-yl, 5-methylaminocytosin-1-yl, 5-dimethylaminocytosin-1-yl, 6-azacytosin-1-yl, 6-aza-5-methylcytosin-1-yl, adenin-9-yl, 2-fluoroadenin-9-yl, 2-azaadenin-9-yl, 7-deazaadenin-9-yl, 8-azaadenin-9-yl, 8-aza-9-deazaadenin-9-yl, 7-deaza-7-cyanoadenin-9-yl, N⁶-methyladenin-9-yl, N⁶-dimethyladenin-9-yl, gunin-9-yl, 8-azaguanin-9-yl, 7-deazaguanin-9-yl, isoguanin-9-yl, hypoxanthin-9-yl and xanthin-9-yl;

$B^2$ represents uracil-1-yl, 5-fluorouracil-1-yl, 5-alkyluracil-1-yl, 5-trifluoromethyluracil-1-yl, 5-nitrouracil-1-yl, 5-methylaminouracil-1-yl, 5-dimethylaminouracil-1-yl, 6-azauracil-1-yl, 6-aza-5-methyluracil-1-yl, N⁴-benzoylcytosin-1-yl, N⁴-benzoyl-5-fluorocytosin-1-yl, N⁴-benzoyl-5-alkylcytosin-1-yl, N⁴-benzoyl-5-trifluoromethylcytosin-1-yl, N⁴-benzoyl-5-nitrocytosin-1-yl, N⁴-benzoyl-5-methylaminocytosin-1-yl, N⁴-benzoyl-5-dimethylaminocytosin-1-yl, N⁴-benzoyl-6-azacytosin-1-yl, N⁴-benzoyl-6-aza-5-methylcytosin-1-yl, N¹,N⁶-dibenzoyladenin-9-yl, N¹,N⁶-dibenzoyl-2-fluoroadenin-9-yl, N¹,N⁶-dibenzoyl-7-deazaadenin-9-yl, N¹,N⁶-dibenzoyl-8-azaadenin-9-yl, N¹,N⁶-dibenzoyl-8-aza-9-deazaadenin-9-yl, N¹,N⁶-dibenzoyl-7-deaza-7-cyanoadenin-9-yl, N⁶-benzoyl-N⁶-methyladenin-9-yl, N⁶-dimethyladenin- 9-yl, N²-benzoylguanin-9-yl, N²-benzoyl-8-azaguanin-9-yl, N²-benzoyl-7-deazaguanin-9-yl, N⁶-benzoyl-isoguanin-9-yl, hypoxanthin-9l-yl and xanthin-9-yl.

The nucleoside of Formula II is treated with an acylating agent, preferably benzoyl chloride, in an inert anhydrous organic solvent such as pyridine at a temperature of 0° to 30°C. for a period of 8 to 24 hours to yield the perbenzoylated nucleoside of Formula III.

The nucleosides of Formula IV are prepared by treating nucleosides of Formula III with lithium benzoate in an anhydrous organic solvent such as hexamethylphosphorotriamide at a temperature of 80° to 140°C. for at least 12 hours until the 5-benzoyloxy-perbenzoylated nucleosides of Formula IV are formed.

The nucleosides of Formula IV are treated with a base to yield the unprotected 4'-alkoxy or 4'-hlaoalkoxy nucleosides of Formula I wherein OR⁵, OR⁶ and one of R² and R³ are hydroxy. Treatment with concentrated ammonium hydroxide in methanol at a temperature between 20° and 100°C. for from 1 to 24 hours is usually sufficient for removing all acyl protecting groups. The unprotected 4'-alkoxy or 4'-haloalkoxy nucleosides can then be esterified to yield compounds of Formula I wherein OR⁵, OR⁶ and one of R² and R³ are acyloxy. To form the O-benzoyl or substituted benzoyl esters, the unprotected nucleoside is reacted with benzoyl chloride, or an alkyl, nitro, or chloro substituted benzoyl chloride in a pyridine solution for from 15 minutes to 2 hours at about 0°C., following which the reaction is maintained at room temperature for at least 4 hours. The unprotected nucleoside can also be esterified with a lower aliphatic hydrocarbon acyl group such as acetyl, propionyl, butyryl, valeryl, dihydrocinnanyl and the like by reacting the unprotected nucleoside with the corresponding lower aliphatic hydrocarbon acid chloride in pyridine at about room temperature for at least 4 hours. The preferred ester groups are benzoyl or substituted benzoyl.

The 4'-alkoxy-5'-deoxy-5'-iodo-β-D-ribofuranosyl nucleoside intermediates and the corresponding 4'-haloalkoxy nucleoside intermediates of Formula II wherein R⁷ is hydroxy and R⁸ is hydrogen can be prepared in accordance with the following reaction sequence:

In the above sequence
R and B¹ are as previously defined:

B³ represents uracil-1-yl, 5-fluorouracil-1-yl, 5-alkyluracil-1-yl, 5-trifluoromethyluracil-1-yl, 5-nitrouracil-1-yl, 5-methylaminouracil-1-yl, 5-dimethylaminouracil-1-yl, 6-azauracil-1-yl, 6-aza-5-methyluracil-1-yl, N⁴-acetylcytosin-1-yl, N⁴-acetyl-5-fluorocytosin-1-yl, N⁴-acetyl-5-alkylcytoxin-1-yl, N⁴-acetyl-5-trifluoromethyl-cytosin-1-yl, N⁴-acetyl-5-nitrocytosin-1-yl, N⁴-acetyl-5-methylaminocytosin-1-yl, N⁴-acetyl-5-dimethylaminocytosin-1-yl, N⁴-acetyl-6-azacytosin₂1-yl, N⁴-acetyl-6-aza-5-methyl cytosin-1-yl, N⁶-benzoyl-adenin-9-yl, N⁶-benzoyl-2-fluoroadenin-9-yl, N⁶-benzoyl-2-azaadenin-9-yl, N⁶-benzoyl-7-deazaadenin-9-yl, N⁶-benzoyl-8-azaadenin-9-yl, N⁶-benzoyl-8-zaz-9-deazaadenin-9-yl, N⁶-benzoyl-7-deaza-7-cyanoadenin-9-yl, N⁶-benzoyl-N⁶-methyladenin-9-yl, N⁶-dimethyladenin-9-yl, N²-acetylguanin-9-yl, N²-acetyl-8-azaguan-9-yl, N²-acetyl-7-deazaguanin-9-yl, N⁶-acetyl-isoguanin-9-yl, hypoxanthin-9-yl, and xanthin-9-yl; and B⁴ represents uracil-1-yl, 5-fluorouracil-1-yl, 5-alkyluracil-1-yl, 5-trifluoromethyluracil-1-yl, 5-nitrouracil-1-yl, 5-methylaminouracil-1-yl, 5-dimethylaminouracil-1-yl, 6-azauracil-1-yl, 6-aza-5-methyluracil-1-yl, N⁴-acetylcytosin 1-yl, N⁴-acetyl-5-fluorocytosin-1-yl, N⁴-acetyl-5-alkylcytosin-1-yl, N⁴-acetyl-5-trifluoromethyl-cytosin-1-yl, N⁴-acetyl-5-nitrocytosin-1-yl, N⁴-acetyl-5-methylaminocytosin-1-yl, N⁴-acetyl-5-dimethylaminocytosin-1-yl, N⁴-acetyl-6-azacytosin-1-yl, N⁴-acetyl-6-aza-5-methylcytosin-1-yl, N¹,N⁶-dibenzoyladenin-9-yl, N¹,N⁶-dibenzoyl-2-fluoroadenin-9-yl, N¹,N⁶-dibenzoyl-2-azaadenin-9-yl, N¹,N⁶-dibenzoyl-7-deazaadenin-9-yl, N¹,N⁶-dibenzoyl-8-azaadenin-9-yl, N¹,N⁶-dibenzoyl-8-aza-9-deazaadenin-9-yl, N¹,N⁶-debenzoyl-7-deaza-7-cyanoadenin-9-yl, N⁶-benzoyl-N⁶-methyladenin-9-yl and N⁶-dimethyladenin-9-yl.

The nucleosides of Formula VII are prepared by halogenating the well known nucleosides of Formula VI with an alkyltriaryloxyphosphonium iodide or an

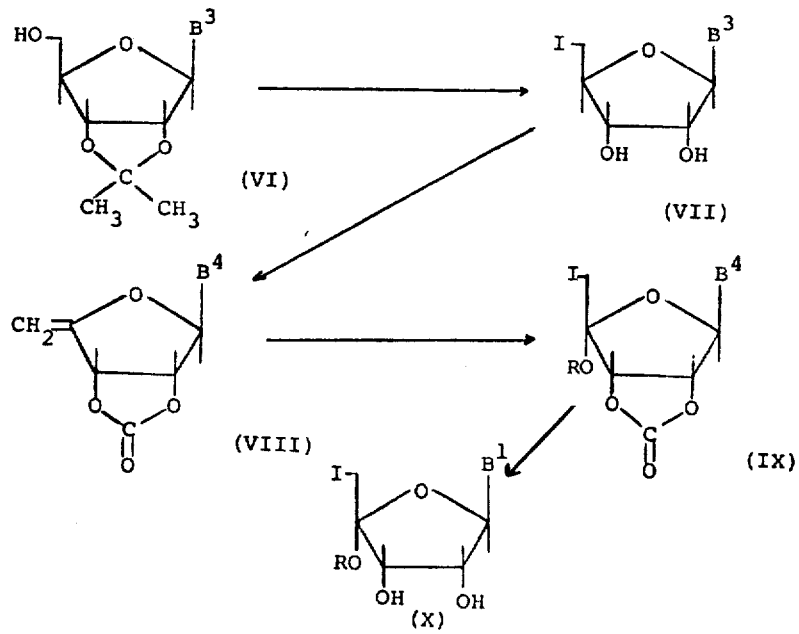

aralkyltriaryloxyphosphonium iodide, preferably methyltriaryloxyphosphonium iodide. This halogenation is carried out in an anhydrous inert organic solvent at a temperature between 0° and 30°C. for a period of 15 to 120 minutes. Suitable inert organic solvents for the halogenation of pyrimidine nucleosides include dimethylformamide, dimethylacetamide and hexamethylphosphorotriamide, preferably dimethylformamide. The halogenation of purine nucleosides is carried out by suspending the purine compound in a suitable anhydrous solvent, cooling the well stirred suspension to a temperature between −80° and −70°C. prior to adding the halogenating agent under anhydrous conditions, and then allowing the reaction mixture to warm to a temperature between 15° and 35°C. over a period of 2 to 8 hours. Suitable organic solvents for the halogenation of purine nucleosides include methylene chloride, tetrahydrofuran and dioxane with methylene chloride preferred. The 2',3'-O-isopropylidene protecting groups are then cleaved with an organic acid to yield the corresponding free hydroxy nucleoside compounds of Formula VII.

The nucleosides of Formula VIII are prepared by dehydrohalogenation and subsequent carbonation of nucleosides of Formula VII. The preferred procedure for the preparation of nucleosides of Formula VIII, with the exception of nucleosides wherein $B^4$ is an unsubstituted or substituted adenin-9-yl, 2-azaadenin-9-yl, 8-azaadenin-9-yl, 7-deazaadenin-9-yl or 8-aza-9-deazaadenin-9-yl, comprises dehydrohalogenating a nucleoside of Formula VII with 1,5-diazabicyclo[4.3.0]non-5-ene in an anhydrous basic organic solvent such as pyridine or an alkyl substituted pyridine, e.g. picolines, at a temperature between 15° and 25°C. for a period of 12 to 48 hours. The resulting reaction mixture is cooled to a temperature between −80° and −70°C. A solution of phosgene in benzene is added under anhydrous conditions and the reaction mixture is allowed to warm to a temperature between 15° and 25°C. over a period of 1 to 2 hours.

In the preparation of nucleosides of Formula VIII wherein $B^4$ is an unsubstituted or substituted adenin-9-yl, 2-azaadenin-9-yl, 8-azaadenin-9-yl, 7-deazaadenin-9-yl or 8-aza-9-deazaadenin-9-yl base, the corresponding nucleoside of Formula VII is first dehydrohalogenated with 1,5-diazabicyclo[4.3.0]non-5-ene in an anhydrous organic solvent such as dimethylformamide, dimethylacetamide or hexamethylphosphorotriamide, preferably dimethylformamide. The reaction is carried out in the absence of light at a temperature of 15° to 25°C. for a period of 12 to 24 hours. Thereafter the reaction mixture is evaporated to dryness and the residue is purified by chromatography over silica gel in order to remove all N-debenzoylated material. The thus-obtained pure $N^6$-benzoyl-4',5'-unsaturated nucleoside is then dissolved in an anhydrous basic organic solvent, the solution is cooled to a temperature between −80° and −70°C. and a solution of phosgene in benzene is added. Suitable basic organic solvents include pyridine and alkyl substituted pyridines such as picolines. The reaction mixture is allowed to warm to a temperature between 15° and 25°C. over a period of 1 to 2 hours and is then evaporated to dryness under vacuum. The resulting residue is purified by partition between chloroform and 10 percent aqueous sodium bicarbonate. The organic layer is washed with water, dried with magnesium sulfate, filtered and evaporated to dryness. The resulting syrupy residue is then dissolved in an anhydrous basic organic solvent, such as pyridine and treated with an acylating agent, preferably benzoyl chloride. The reaction is carried out at a temperature of 15° to 25°C. for a period of 12 to 24 hours. This acylation reaction produces the $N^1,N^6$-dibenzoylated 4',5'-unsaturated nucleoside of Formula VIII (wherein $B^4$ is limited to the previously enumerated bases) and prevents the possibility of $N^3,4'$ or $N^3,5'$-cyclization.

The nucleosides of Formula IX are prepared by treating a 4',5'-unsaturated nucleoside of Formula VIII with iodine and a lower alkanol or haloalkanol. The reaction is carried out by dissolving a nucleoside of Formula VIII in a lower alkanol or haloalkanol containing a molar excess of silver acetate or lead carbonate and then vigorously stirring while treating with iodine in the absence of light at a temperature of 15° to 25°C. for a period of 15 minutes to 2 hours. Alkanols and haloalkanols that can be employed in the process of the present invention include methanol, ethanol, 2-chloroethanol, 2,2-dichloroethanol and 2,2,2-trichloroethanol and the corresponding fluoroalkanols.

The nucleosides of Formula X are prepared by removing all protecting groups in nucleosides of Formula VIII by treatment with a base such as sodium methoxide or barium methoxide in methanol at a temperature between 15° and 25°C. for 15 minutes to 1 hour. The reaction mixture is then neutralized by the addition of an ion exchange resin (Amberlite IRC 50 COO⁻H⁺). The mixture is filtered, the resin is thoroughly washed with methanol and the combined filtrate and washings then evaporated to dryness. The residue is purified by chromatography over silica gel.

Although not depicted in the reaction sequence, a nucleoside of Formula X can be converted to the α-L-lyxo isomer by dissolving in 0.1 N methanolic HCL (other appropriate alcohols may also be used) and following the equilibration which takes 2 to 24 hours by thin-layer chromatography.

The 4'-alkoxy-2',5'-dideoxy-5'-iodo-β-D-erythro-pentofuranosyl nucleosides of Formula II where $R^7$ and $R^8$ are hydrogen and the 4'-alkoxy-5'-deoxy-5'-iodo-β-D-arabinofuranosyl nucleosides of Formula II where $R^7$ is hydrogen and $R^8$ is hydroxy can be prepared in accordance with the following reaction sequence:

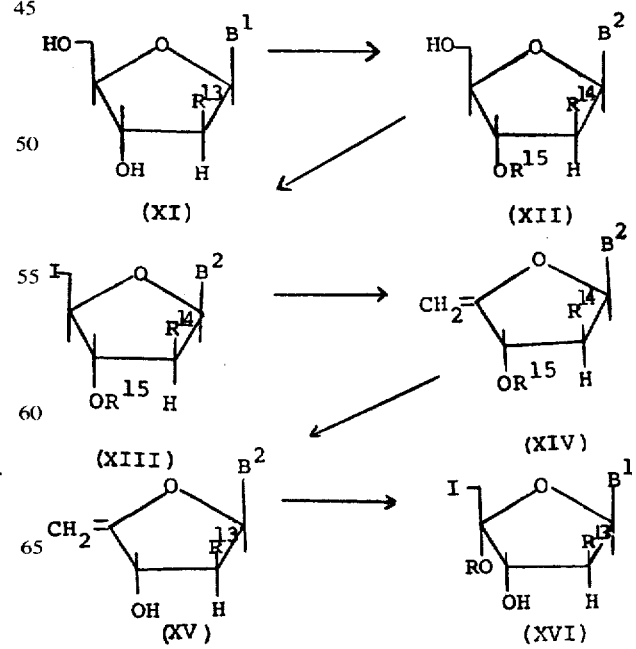

In the above sequence

R, $B^1$ and $B^2$ are as previously defined;
$R^{13}$ is hydrogen or hydroxy;
$R^{14}$ is hydrogen or hydrolyzable acyloxy; and
$R^{15}$ is a hydrolyzable acyl group;
provided that when $R^{13}$ is H, B is a pyrimidine base.

The nucleosides of Formula XII are prepared by first etherifying the known nucleosides of Formula XI at the 5'-position with monomethoxytrityl chloride in a basic organic solvent such as pyridine or an alkyl substituted pyridine (e.g. picolines) at a temperature between 15° and 25°C for a period of 12 to 24 hours. The resulting 5'-etherified product without further purification is then treated with an acylating agent, such as benzoyl chloride, in dry pyridine at a temperature between 15° and 25°C for a period of 12 to 24 hours to yield the 5'-etherified perbenzoylated nucleoside. The 5'-ether group is then selectively cleaved with an organic acid to yield the nucleoside of Formula XII. All substituted and unsubstituted β-D-arabinofuranosylcytosine and 6-azacytosine nucleosides of Formula XI wherein $R^{13}$ is hydroxy, are converted to the $N^4$-benzoyl derivative prior to the above-described etherification. This acylation is carried out with benzoic anhydride in ethanol at reflux for a period of 6 to 8 hours.

The nucleosides of Formula XIII are prepared by halogenating the respective nucleoside esters of Formula XII with an alkyltriaryoxyphosphonium iodide or an aralkyltriaryloxyphosphonium iodide, preferably with methyltriphenoxyphosphonium iodide. The halogenation of 2'-deoxy-and arabinofuranosyl pyrimidine nucleosides is carried out in an inert organic solvent at a temperature of 15° to 25°C for a period of 15 minutes to 2 hours. Suitable solvents include dimethylformamide, dimethylacetamide or hexamethylphosphorotriamide, dimethylformamide being preferred. The halogenation of arabinofuranosyl purine nucleosides is carried out by suspending the respective nucleoside of Formula XII wherein $R^{14}$ is acyloxy, in a suitable solvent, cooling the solution to a temperature between −80° and −70°C and adding, under anhydrous conditions and vigorous stirring, methyltriphenoxyphosphonium iodide. The reaction mixture is allowed to warm to a temperature between 15° to 25°C over a period of 1 to 3 hours. Suitable solvents for the halogenation of the purine nucleosides include methylene chloride, tetrahydrofuran and dioxane, with methylene chloride preferred.

The nucleosides of Formula XIII are dehydrohalogenated by treating with silver fluoride to give the 4',5'-unsaturated nucleosides of Formula XIV. The dehydrohalogenation reaction is run in a basic organic solvent at a temperature between 15° and 25°C for a period of 96 to 120 hours. As a basic organic solvent pyridine or alkyl-substituted pyridines (e.g. picolines) can be used, with pyridine preferred. Alternatively, nucleosides of Formula XIII can be dehydrohalogenated by treating with 1,5-diazabicyclo[4.3.0]-non-5-ene in an anhydrous organic solvent such as dimethylformamide, dimethylacetamide or hexamethylphosphorotriamide, preferably dimethylformamide, at a temperature of 15° to 25°C for a period of 21 to 48 hours.

The O-benzoyl protecting groups are then cleaved in the nucleosides of Formula XIV to give the free hydroxy nucleosides of Formula XV. This hydrolysis can be carried out with sodium hydroxide in a mixture of ethanol and pyridine at a temperature of 15° to 25°C for a period of 5 to 10 minutes.

The nucleosides of Formula XVI are then prepared by iodoalkoxylation of nucleosides of Formula XV with iodine and a lower alkanol or haloalkanol. The reaction is carried out as previously described for the preparation of 4'-alkoxy5'-deoxy-5'-iodo-β-D-ribofuranosyl nucleosides of Formula X. The resulting reaction product is a mixture of isomers, e.g. iodoalkoxylation of a 4',5'-unsaturated-2'-deoxy pyrimidine nucleoside yields the β-D-erythro-pentofuranosyl and the α-L-threo-pentofuranosyl isomers, whereas iodoalkoxylation of a 4',5'-unsaturated-arabinofuranosyl nucleoside yields the β-D-arabinofuranosyl and α-L-xylofuranosyl isomers. The isomers are separated by acetylation of the reaction mixture with acetic anhydride followed by physical separation by thin-layer chromatography. The pure isomers are then completely deacylated by treatment with a base such as ammonium hydroxide in methanol or methanolic ammonia at a temperature of 25° to 100°C for a period of 1 to 24 hours to yield 4'-alkoxy-2',5'-dideoxy-5'-iodo-β-D-erythropentofuranosyl or 4'-alkoxy-5'-deosy-5'-iodo-β-D-arabinofuranosyl nucleosides. Examples 1 through 27 relate to preparation of the 5'-iodo nucleoside intermediates of Formulas II and III.

EXAMPLE 1

5'-deoxy-5'-iodo-uridine

2',3'-O-isopropylidene-uridine (1 mmole) is dissolved in 10 ml. of dry dimethylformamide and methyltriphenoxyphosphonium iodide (1.2 mmole) is added. After 15 minutes at 20°C the excess reagent is decomposed with methanol and the solvents are evaporated under vacuum. The resulting residue is partitioned between ethylacetate and water and the ethylacetate layer is successively washed with an aqueous 10 percent solution of sodium thiosulfate and water. The organic layer is then dried over magnesium sulfate, filtered and evaporated to dryness. The residue is purified by chromatography over silica gel and the desired nucleoside containing fractions are collected and evaporated to dryness under vacuum. The resulting residue is then dissolved in 5 ml. of a mixture of formic acid and water (9:1). After 48 hours at 30°C the solvents are evaporated under vacuum. The residue is dissolved in a mixture of methanol and water (1:1) and the pH of the solution is adjusted to 8.5 in order to hydrolyze residual formate groups. The solvents are then evaporated under vacuum and the residue is chromatographed over silica gel. The nucleoside containing fractions are collected and evaporated to dryness. The resulting residue is crystallized from methanol to yield 5'-deoxy-5'-iodouridine.

EXAMPLE 2

5'-deoxy-5'-iodo-β-D-ribofuranosyl pyrimidines

Repeating the procedure of Example 1 but replacing 2',3'-O-isopropylidene-uridine with
2',3'-O-isopropylidene-5-fluorouridine,
2',3'-O-isopropylidene-5-butyluridine,
2',3'-O-isopropylidene-5-trifluoromethyluridine,
2',3'-O-isopropylidene-5-nitrouridine,
2',3'-O-isopropylidene-5-methylaminouridine,
2',3'-O-isopropylidene-5-dimethylaminouridine,
2',3'-O-isopropylidene-6-azauridine,
2',3'-O-isopropylidene-6-aza-5-methyluridine,
$N^4$-acetyl-2',3'-O-isopropylidene-cytidine, N⁴-acetyl-2',3'-O-isopropylidene-5-fluorocytidine,
N⁴-acetyl-2',3'-O-isopropylidene-5-butylcytidine,
N⁴-acetyl-2',3'-O-isopropylidene-5-trifluoromethyl-
  cytidine,
N⁴-acetyl-2',3'-O-isopropylidene-5-nitrocytidine,
N⁴-acetyl-2',3'-O-isopropylidene-5-
  methylaminocytidine,
N⁴-acetyl-2',3'-O-isopropylidene-5-
  dimethylaminocytidine,
N⁴-acetyl-2',3'-O-isopropylidene-6-azacytidine, and
N⁴-acetyl-2',3'-O-isopropylidene-6-aza-5-
  methylcytidine
yields the corresponding,
  5'-deoxy-5'-iodo-5-fluorouridine,
  5'-deoxy-5'-iodo-5-butyluridine,
  5'-deoxy-5'-iodo-5-trifluoromethyluridine,
  5'-deoxy-5'-iodo-5-nitrouridine,
  5'-deoxy-5'-iodo-5-methylaminouridine,
  5'-deoxy-5'-iodo-5-dimethylaminouridine,
  5'-deoxy-5'-iodo-6-azauridine,
  5'deoxy-5'-iodo-6-aza-5-methyluridine,
  N⁴-acetyl-5'-deoxy-5'-iodo-cytidine,
  N⁴-acetyl-5'-deoxy-5'-iodo-5-fluorocytidine,
  N⁴-acetyl-5'-deoxy-5'-iodo-5-butylcytidine,
  N⁴-acetyl-5'-deoxy-5'-iodo-5-trifluoromethylcyti-
    dine,
  N⁴-acetyl-5'-deoxy-5'-iodo-5-nitrocytidine,
  N⁴-acetyl-5'-deoxy-5'-iodo-5-methylaminocytidine,
  N⁴-acetyl-5'-deoxy-5'-iodo-5-
    dimethylaminocytidine,
  N⁴-acetyl-5'-deoxy-5'-iodo-6-azacytidine, and
  N⁴-acetyl-6-aza-5-methylcytidine.

EXAMPLE 3

N⁶-benzoyl-5'-deoxy-5'-iodo-adenosine

N⁶-benzoyl-2'3'-O-isopropylidene-adenosine (1 mmole) is suspended in 10 ml. of dry methylene chloride, and the solution is cooled to −70°C. Methyltriphenoxyphosphonium iodide (1.5 mmole) is then added in a dry nitrogen atmosphere and the reaction mixture is allowed to warm to 20°C. Two hours after the addition of methyltriphenoxyphosphonium iodide, the excess reagent is decomposed with methanol and the solvents are evaporated under vacuum at 30°C. The resulting residue is partioned between chloroform and water, and the chloroform layer is successively washed with an aqueous 10 percent solution of sodium thiosulfate and water. The chloroform layer is then dried over magnesium sulfate, filtered and evaporated under vacuum. The resulting residue is dissolved in 10 ml. of a mixture of formic acid and water (9:1). After 48 hours at 30°C the solvents are evaporated under vacuum. The residue is dissolved in a mixture of methanol and water (1:1) and the pH of the solution is adjusted to 8.5 in order to hydrolyze residual formate groups. The solvents are then evaporated under vacuum and the residue is purified by chromatography over silica gel. The nucleoside containing fractions are collected and evaporated to dryness to yield N⁶-benzoyl-5'-deoxy-5'-iodo-adenosine.

EXAMPLE 4

5'-deoxy-5'-iodo-β-D-ribofuranosyl purines

Repeating the procedure of Example 3 but replacing N⁶-benzoyl-2',3'-O-isopropylidene-adenosine with
  N⁶-benzoyl-2',3'-O-isopropylidene-2-
    fluoroadenosine,
  N⁶-benzoyl-2',3'-O-isopropylidene-2-azaadenosine,
  N⁶-benzoyl-2'-3'-O-isopropylidene-7-
    deazaadenosine,
  N⁶-benzoyl-2'-3'-O-isopropylidene-8-azaadenosine,
  N⁶-benzoyl-2'-3'-O-isopropylidene-8-aza-9-
    deazaadenosine,
  N⁶-benzoyl-2'-3'-O-isopropylidene-7-deaza-7-
    cyanoadenosine,
  N⁶-benzoyl-  N⁶-methyl-2',3'-O-
    isopropylideneadenosine,
  N⁶-dimethyl-2',3'-O-isopropylidene-adenosine,
  N²-acetyl-2',3'-O-isopropylidene-guanosine,
  N²-acetyl-2',3'-O-isopropylidene-8-azaguanosine,
  N²-acetyl-2',3'-O-isopropylidene-7-deazaguanosine,
  N⁶-acetyl-2',3'-O-isopropylidene-isoguanosine,
  2',3'-O-isopropylidene-inosine, and
  2',3'-O-isopropylidene-xanthosine
yields the corresponding
  N⁶-benzoyl-5'-deoxy-5'-iodo-2-fluoroadenosine,
  N⁶-benzoyl-5'-deoxy-5'-iodo-2-azaadenosine,
  N⁶-benzoyl-5'-deoxy-5'-iodo-7-deazaadenosine,
  N⁶-benzoyl-5'-deoxy-5'-iodo-8-azaadenosine,
  N⁶-benzoyl-5'-deoxy-5'-iodo-8-aza-9-
    deazaadenosine,
  N⁶-benzoyl-5'-deoxy-5'-iodo-7-deaza-7-
    cyanoadenosine,
  N⁶-benzoyl-N⁶-methyl-5'-deoxy-5'-iodo-adenosine,
  N⁶-dimethyl-5'-deoxy-5'-iodo-adenosine,
  N²-acetyl-5'-deoxy-5'-iodo-guanosine,
  N²-acetyl-5'-deoxy-5'-iodo-8-azaquanosine,
  N²-acetyl-5'-deoxy-5'-iodo-7-deazaguanosine,
  N⁶-acetyl-5'-deoxy-5'-iodo-isoguanosine,
  5'-deoxy-5'-iodo-inosine, and
  5'-deoxy-5'-iodo-xanthosine.

EXAMPLE 5

1-(2,3-O-carbonyl-5-deoxy-β-D-erythro-pent-4-
  enofuranosyl)-uracil

5'-deoxy-5'-iodouridine (1 mmole) is dissolved in 10 ml. of dry pyridine containing 1,5-diazabicyclo [4.3.0]-non-5-ene (2 mmoles). The reaction mixture is held at 40°C. for 20 hours in the dark and then cooled to −70°C. To this reaction mixture, 1.6 ml. of a 12.5 percent solution of phosgene in benzene is added under anhydrous conditions and vigorous stirring and the temperature is then allowed to warm to 20°C. One hour after the addition of phosgene the mixture is evaporated to dryness and the residue is partitioned between ethyl acetate and water. The ethyl acetate layer is dried over magnesium sulfate, filtered, decolorized with charcoal, filtered again and finally evaporated to dryness. The resulting residue is crystallized from ethyl acetate to yield 1-(2,3,-O-carbonyl-5-deoxy-β-D-erythro-pent-4-enofuranosyl)-uracil.

EXAMPLE 6

1-(2,3-O-carbonyl-5-deoxy-β-D-erythro-pent-4-
enofuranosyl)-pyrimidines, and
9-(2,3-O-carbonyl-5-deoxy-β-D
erythro-pent-4-enofuranosyl)-purines Repeating the procedure of Example 5 by replacing
5'-deoxy-5'-iodo-uridine with
 5'-deoxy-5'-iodo-5-fluorouridine,
 5'-deoxy-5'-iodo-5-butyluridine,
 5'-deoxy-5'-iodo-5-trifluoromethyluridine,
 5'-deoxy-5'-iodo-5-nitrouridine,
 5'-deoxy-5'-iodo-5-methylaminouridine,
 5'-deoxy-5'-iodo-5-dimethylaminouridine,
 5'-deoxy-5'-iodo-6-azauridine,
 5'-deoxy-5'-iodo-6-aza-5-methyluridine,
 $N^4$-acetyl-5'-deoxy-5'-iodo-cytidine,
 $N^4$-acetyl-5'-deoxy-5'-iodo-5-fluorocytidine,
 $N^4$-acetyl-5'-deoxy-5'-iodo-5-butylcytidine,
 $N^4$-acetyl-5'-deoxy-5'-iodo-5-trifluoromethylcytidine,
 $N^4$-acetyl-5'-deoxy-5'-iodo-5-nitrocytidine,
 $N^4$-acetyl-5'-deoxy-5'-iodo-5-methylaminocytidine,
 $N^4$-acetyl-5'-deoxy-5'-iodo-5-dimethylaminocytidine,
 $N^4$-acetyl-5'-deoxy-5'-iodo-6-azacytidine,
 $N^4$-acetyl-5'-deoxy-5'-iodo-6-aza-5-methylcytidine,
 $N^2$-acetyl-5'-deoxy-5'-iodo-guanosine,
 $N^2$-acetyl-5'-deoxy-5'-iodo-8-azaquanosine,
 $N^2$-acetyl-5'-deoxy-5'-iodo-7-deazaguanosine,
 $N^6$-acetyl-5'-deoxy-5'-iodo-isoguanosine,
 5'-deoxy-5'-iodoinosine, and
 5'-deoxy-5'-iodoxanthosine.
yields the corresponding
 1-(2,3-O-carbonyl-5-deoxy-β-D-erythro-pent-4-
 enofuranosyl)-5-fluorouracil,
 1-(2,3-O-carbonyl-5-deoxy-β-D-erythro-pent-4-
 enofuranosyl)-5-butyluracil,
 1-(2,3-O-carbonyl-5-deoxy-β-D-erythro-pent-4-
 enofuranosyl)-5-trifluoromethyluracil,
 1-(2,3-O-carbonyl-5-deoxy-β-D-erythro-pent-4-
 enofuranosyl)-5-nitrouracil,
 1-(2,3-O-carbonyl-5-deoxy-β-D-erythro-pent-4-
 enofuranosyl)-5-methylaminouracil,
 1-(2,3-O-carbonyl-5-deoxy-β-D-erythro-pent-4-
 enofuranosyl)-5-dimethylaminouracil,
 1-(2,3-O-carbonyl-5-deoxy-β-D-erythro-pent-4-
 enofuranosyl)-6-azauracil,
 1-(2,3-O-carbonyl-5-deoxy-β-D-erythro-pent-4-
 enofuranosyl)-6-aza-5-methyluracil,
 $N^4$-acetyl-1-(2,3-O-carbonyl-5-deoxy-β-D-
 erythropent-4-enofuranosyl)-cytosine,
 $N^4$-acetyl-1-(2,3-O-carbonyl-5-deoxy-β-D-
 erythropent-4-enofuranosyl)-5-fluorocytosine,
 $N^4$-acetyl-1-(2,3-O-carbonyl-5-deoxy-β-D-
 erythropent-4-enofuranosyl)-5-butylcytosine,
 $N^4$-acetyl-1-(2,3-O-carbonyl-5-deoxy-β-D-
 erythropent-4-enofuranosyl)-5-trifluoromethylcytosine,
 $N^4$-acetyl-1-(2,3-O-carbonyl-5-deoxy-β-D-
 erythropent-4-enofuranosyl)-5-nitrocytosine,
 $N^4$-acetyl-1-(2,3-O-carbonyl-5-deoxy-β-D-
 erythropent-4-enofuranosyl)-5-
 methylaminocytosine,
 $N^4$-acetyl-1-(2,3-O-carbonyl-5-deoxy-β-D-
 erythropent-4-enofuranosyl)-5-
 dimethylaminocytosine,
 $N^4$-acetyl-1-(2,3-O-carbonyl-5-deoxy-β-D-
 erythropent-4-enofuranosyl)-6-azacytosine,
 $N^4$-acetyl-1-(2,3-O-carbonyl-5-deoxy-β-D-
 erythropent-4-enofuranosyl)-6-aza-5-
 methylcytosine,
 $N^2$-acetyl-9-(2,3-O-carbonyl-5-deoxy-β-D-
 erythropent-4-enofuranosyl)guanine,
 $N^2$-acetyl-9-(2,3-O-carbonyl-5-deoxy-β-D-
 erythropent-4-enofuranosyl)-8-azaguanine,
 $N^2$-acetyl-9-(2,3-O-carbonyl-5-deoxy-β-D-
 erythropent-4-enofuranosyl)-7-deazaguanine,
 $N^6$-acetyl-9-(2,3-O-carbonyl-5-deoxy-β-D-
 erythropent-4-enofuranosyl)-isoguanine.
 9-(2,3-O-carbonyl-5-deoxy-β-D-erythro-pent-4-
 enofuranosyl)-hypoxanthine, and
 9-(2,3-O-carbonyl-5-deoxy-β-D-erythro-pent-4-
 enofuranosyl)-xanthine.

EXAMPLE 7

$N^1,N^6$-dibenzoyl-9-(2,3-O-carbonyl-5-deoxy-β-D-
erythropent-4-enofuranosyl)-adenine $N^6$-benzoyl-5'-deoxy-5'-iodo-adenosine (1 mmole) is dissolved in 10 ml. of dry dimethylformamide containing 1,5-diazabicyclo-[4.3.0]-non-5-ene (1.2 mmole). The reaction mixture is held at 20°C for 10 hours in the dark and then evaporated to dryness. The resulting residue is chromatographed over silica gel to remove trace amounts of debenzoylated material. The major 4',5'-unsaturated nucleoside fraction is collected and evaporated to dryness. The resulting residue is dissolved in 15 ml. of pyridine, the solution is cooled to −70°C. and a 12.5 percent solution of phosgene (1.50 equivalents) in benzene is added. The solution is allowed to warm to 20°C. and 6 hours after the phosgene addition the solvents and reagents are removed by evaporation under vacuum. The residue is partitioned between chloroform and an aqueous 10 percent solution of sodium bicarbonate. The chloroform layer is washed with water, dried with magnesium sulfate, filtered and evaporated to dryness. The resulting syrupy residue is dissolved in 10 ml. of dry pyridine and benzoyl chloride (20 equivalents) is added. After 24 hours at 20°C. the solvents are evaporated under vacuum. The residue is purified by chromatography over silica gel to yield $N^1,N^6$-dibenzoyl-9-(2,3-O-carbonyl-5-deoxy-β-D-erythro-pent-4-enofuranosyl)adenine as a pure foam.

EXAMPLE 8

9-(2,3-O-carbonyl-5-deoxy-β-D-erythro-pent-4-
enofuranosyl)-adenines

Repeating the procedure of Example 7 but replacing
$N^6$-benzoyl-5'-deoxy-5'-iodo-adenosine with
 $N^6$-benzoyl-5'-deoxy-5'-iodo-2-fluoroadenosine,
 $N^6$-benzoyl-5'-deoxy-5'-iodo-7-deazaadenosine,
 $N^6$-benzoyl-5'-deoxy-5'-iodo-8-azaadenosine,
 $N^6$-benzoyl-5'-deoxy-5'-iodo-8-aza-9-
 deozaadenosine,
 $N^6$-benzoyl-5'-deoxy-5'-iodo-7-deaza-7-
 cyanoadenosine,
 $N^6$-benzoyl-$N^6$-methyl-5'-deoxy-5'-iodo-adenosine, and
 $N^6$-dimethyl-5'-deoxy-5'-iodo-adenosine
yields the corresponding
 $N^1,N^6$-dibenzoyl-9-(2,3-O-carbonyl-5-deoxy-β-D erythro-pent-4-enofuranosyl)-2-fluoroadenine, N$^1$,N$^6$-dibenzoyl-9-(2,3-O-carbonyl-5-deoxy-β-D erythro-pent-4-enofuranosyl)-2-azaadenine, N$^1$,N$^6$-dibenzoyl-9-(2,3-O-carbonyl-5-deoxy-β-D erythro-pent-4-enofuranosyl)-7-deazaadenine, N$^1$,N$^6$-dibenzoyl-9-(2,3-O-carbonyl-5-deoxy-β-D erythro-pent-4-enofuranosyl)-8-aza-9-deazaadenine, N$^1$,N$^6$-dibenzoyl-9-(2,3-O-carbonyl-5-deoxy-β-D-erythro-pent-4-enofuranosyl)-7-deaza-7 cyanoadenine, N$^6$-benzoyl-N$^6$-methyl-9-(2,3-O-carbonyl-5-deoxy-β-D-erythro-pent-4-enofuranosyl)-adenine and N$^6$-dimethyl-9-(2,3-O-carbonyl-5-deoxy-β-D erythro-pent-4-enofuranosyl)-adenine.

EXAMPLE 9

2',3'-O-carbonyl-5'-deoxy-5'-iodo-4'-methoxy-uridine 1-(2,3-O-carbonyl-5-deoxy-β-D-erythro-pent-4-enofuranosyl)- uracil (1 mmole) is dissolved in 10 ml. of methanol and silver acetate (1.4 mmoles) is added. To this well-stirred suspension, iodine (1.4 mmoles) in 10 ml. of methanol is slowly added over a period of 10 minutes. After 1 hour at 20°C., the reaction mixture is filtered over Celite and the filtrate evaporated to dryness. The resulting residue is taken up in 250 ml. of ethyl acetate, filtered, and the filtrate washed with an aqueous solution of sodium thiosulfate and then with water. The organic layer is dried with magnesium sulfate, filtered and evaporated to dryness. The residue is chromatographed over silica gel to separate the main nucleoside fraction consisting of 2',3'-O-carbonyl-5'-iodo-5'-methoxyuridine from trace amounts of 1-(2,3-O-carbonyl-5-deoxy-5-iodo-4-methoxy-α-L-lyxofuranosyl) uracil contaminating the crude product.

By replacing methanol with ethanol, 2-chloroethanol, 2,2-dichloroethanol, 2,2,2-trichloroethanol, 2-fluoroethanol, 2,2-difluoroethanol or 2,2,2-trifluoroethanol in the above procedure, the corresonding 4'-alkoxy and 4'-haloalkoxy nucleosides were prepared.

EXAMPLE 10

1-(2,3-O-carbonyl-5-deoxy-5-iodo-4-methoxy-β-D-ribofuranosyl) pyrimidines, and 9-(2,3-O-carbonyl-5-deoxy-5-iodo-4-methoxy-β-D-ribofuranosyl) purines.

Repeating the procedure of Example 9 but replacing 1-(2,3-O-carbonyl-5-deoxy-β-D-erythro-pent-4-enofuranosyl)- uracil with 1-(2,3-O-carbonyl-5-deoxy-β-D-erythro-pent-4-enofuranosyl)-5-fluorouracil, 1-(2,3-O-carbonyl-5-deoxy-β-D-erythro-pent-4-enofuranosyl)-5-butyluracil, 1-(2,3-O-carbonyl-5-deoxy-β-D-erythro-pent-4-enofuranosyl)-5-trifluoromethyluracil, 1-(2,3-O-carbonyl-5-deoxy-β-D-erythro-pent-4-enofuranosyl)-5-nitrouracil, 1-(2,3-O-carbonyl-5-deoxy-β-D-erythro-pent-4-enofuranosyl)-5-methylaminouracil, 1-(2,3-O-carbonyl-5-deoxy-β-D-erythro-pent-4-enofuranosyl)-5-dimethylaminouracil, 1-(2,3-O-carbonyl-5-deoxy-β-D-erythro-pent-4-enofuranosyl)-6-azauracil, 1-(2,3-O-carbonyl-5-deoxy-β-D-erythro-pent-4-enofuranosyl)-6-aza-5-methyluracil, N$^4$-acetyl-1-(2,3-O-carbonyl-5-deoxy-β-D-erythropent-4-enofuranosyl)-cytosine, N$^4$-acetyl-1-(2,3-O-carbonyl-5-deoxy-β-D-erythropent-4-enofuranosyl)-5-fluorocytosine, N$^4$-acetyl-1-(2,3-O-carbonyl-5-deoxy-β-D-erythropent-4-enofuranosyl)-5-butylcytosine, N$^4$-acetyl-1-(2,3-O-carbonyl-5-deoxy-β-D-erythropent-4-enofuranosyl)-5-trifluoromethylcytosine, N$^4$-acetyl-1-(2,3-O-carbonyl-5-deoxy-β-D-erythropent-4-enofuranosyl)-5-nitrocytosine, N$^4$-acetyl-1-(2,3-O-carbonyl-5-deoxy-β-D-erythropent-4-enofuranosyl-5-methylaminocytosine, N$^4$-acetyl-1-(2,3-O-carbonyl-5-deoxy-β-D-erythropent-4-enofuranosyl)-5-dimethylaminocytosine, N$^4$-acetyl-1-(2,3-O-carbonyl-5-deoxy-β-D-erythropent-4-enofuranosyl)-6-azacytosine, N$^4$-acetyl-1-(2,3-O-carbonyl-5-deoxy-β-D-erythropent-4-enofuranosyl)-6-aza-5-methylcytosine, N$^1$,N$^6$-dibenzoyl-9-(2,3-O-carbonyl-5-deoxy-β-D-erythro-pent-4-enofuranosyl)-adenine, N$^1$,N$^6$-dibenzoyl-9-(2,3-O-carbonyl-5-deoxy-β-D-erythro-pent-4-enofuranosyl)-2-fluoroadenine, N$^1$,N$^6$-dibenzoyl-9-(2,3-O-carbonyl-5-deoxy-β-D-erythro-pent-4-enofuranosyl)-2-azaadine, N$^1$,N$^6$-dibenzoyl-9-(2,3-O-carbonyl-5-deoxy-β-D-erythro-pent-4-enofuranosyl)-7-deazaadenine, N$^1$,N$^6$-dibenzoyl-9-(2,3-O-carbonyl-5-deoxy-β-D-erythro-pent-4-enofuranosyl)-8-aza-9-deazaadenine, N$^1$,N$^6$-dibenzoyl-9-(2,3-O-carbonyl-5-deoxy-β-D-erythro-pent-4-enofuranosyl)-7-deaza-7-cyanoadenine, N$^6$-benzoyl-N$^6$-methyl-9-(2,3-O-carbonyl-5-deoxy-β-D-erythro-pent-4-enofuranosyl)-adenine, N$^6$-dimethyl-9-(2,3-O-carbonyl-5-deoxy-β-D-erythropent-4-enofuranosyl)-adenine, N$^2$-acetyl-9-(2,3-O-carbonyl-5-deoxy-β-D-erythropent-4-enofuranosyl)-guanine, N$^2$acetyl-9-(2,3-O-carbonyl-5-deoxy-β-D-erythropent-4-enofuranosyl)-8-azaguanine, N$^2$,acetyl-9-(2,3-O-carbonyl-5-deoxy-β-D-erythropent-4-enofuranosyl)-7-deazaguanine, N$^6$-acetyl-9-(2,3-O-carbonyl-5-deoxy-β-erythropent-4-enofuranosyl)-isoguanine, 9-(2,3-O-carbonyl-5-deoxy-β-D-erythro-pent-4-enofuranosyl)- hypoxanthine, and 9-(2,3-O-carbonyl-5-deoxy-β-D-erythro-pent-4-enofuranosyl)-xanthine yields the corresponding 2'3'-O-carbonyl-5'-deoxy-5'-iodo-4'-methoxy-5-fluorouridine, 2'3'-O-carbonyl-5'-deoxy-5'-iodo-4'-methoxy-5-butyluridine, 2'3'-O-carbonyl-5'-deoxy-5'-iodo-4'-methoxy-5-trifluoromethyluridine, 2',3'-O-carbonyl-5'-deoxy-5'-iodo-4'-methoxy-5-nitrouridine, 2',3'-O-carbonyl-5'-deoxy-5'-iodo-4'-methoxy-5-methylaminouridine, 2',3'-O-carbonyl-5'-deoxy-5'-iodo-4'-methoxy15-dimethylaminouridine, 2',3'-O-carbonyl-5'deoxy-5'-iodo-4'-methoxy-6-azauridine, 2',3'-O-carbonyl-5'-deoxy-5'-iodo-4'-methoxy-6-aza-5-methyluridine N⁴-acetyl-2',3'-O-carbonyl-5'-deoxy-5'-iodo-4'-methoxycytidine,
N⁴-acetyl-2',3'-O-carbonyl-5'-deoxy-5'-iodo-4'-methoxy-5-fluorocytidine,
N⁴-acetyl-2',3'-O-carbonyl-5'-deoxy-5'-iodo-7'-methoxy-5-butylcytidine,
N⁴-acetyl-2',3'-O-carbonyl-5'-deoxy-5'-iodo-4'-methoxy-5-trifluoromethylcytidine,
N⁴-acetyl-2',3'-O-carbonyl-5'-deoxy-5'-iodo-4'-methoxy-5-nitrocytidine,
N⁴-acetyl-2',3'-O-carbonyl-5'-deoxy-5'-iodo-4'-methoxy-5-methylaminocytidine,
N⁴-acetyl-2',3'-O-carbonyl-5'-deoxy-5'-iodo-4'-methoxy-5-dimethylaminocytidine,
N⁴-acetyl-2',3'-O-carbonyl-5'-deoxy-5'-iodo-4'-methoxy-6-azacytidine,
N⁴-acetyl-2',3'-O-carbonyl-5'-deoxy-5'-iodo-4'-methoxy-6-aza-5-methylcytidine,
N¹,N⁶-dibenzoyl-2',3'-O-carbonyl-5'-deoxy-5'-iodo-4'-methoxy-adenosine,
N¹,N⁶-dibenzoyl-2',3'-O-carbonyl-5'-deoxy-5'-iodo-4'-methoxy-2-fluoroadenosine,
N¹, N⁶-dibenzoyl-2',3'-O-carbonyl-5'-deoxy-5'-iodo-4'-methoxy-2-azaadenosine,
N¹,N⁶-dibenzoyl-2',3'-O-carbonyl-5'-deoxy-5'-iodo-4'-methoxy-7-deazaadenosine,
N¹,N⁶-dibenzoyl-2',3'-O-carbonyl-5'-deoxy-5'-iodo-4'-methoxy-8-azaadenosine,
N¹,N⁶-dibenzoyl-2',3'-O-carbonyl-5'-deoxy-5'-iodo-4'-methoxy-8-aza-9-deazaadenosine,
N¹,N⁶-dibenzoyl-2',3'-O-carbonyl-5'-deoxy-5'-iodo-4'-methoxy-7-deaza-7-cyanodenosine,
N⁶-benzoyl-N⁶-methyl-2',3'-O-carbonyl-5'-deoxy-5'-iodo-4'-methoxy-adenosine,
N⁶-dimethyl-2',3'-O-carbonyl-5'-deoxy-5'-iodo-4'-methoxy-adenosine,
N²-acetyl-2',3'-O-carbonyl-5'-deoxy-5'-iodo-4'-methoxy-guanosine,
N²-acetyl-2',3'-O-carbonyl-5'-deoxy-5'-iodo-4'-methoxy-8-azaguanosine,
N²-acetyl-2',3'-O-carbonyl-5'-deoxy-5'-iodo-4'-methoxy-7-deazaguanosine,
N⁶-acetyl-2',3'-O-carbonyl-5'-deoxy-5'-iodo-4'-methoxy-isoguanosine,
2',3'-O-carbonyl-5'-deoxy-5'-iodo-4'-methoxy-inosine, and,
2',3'-O-carbonyl-5'-deoxy-5'-iodo-4'-methoxyxanthosine.

EXAMPLE 11

5'-deoxy-5'-iodo-4'-methoxy-uridine

2',3'-O-carbonyl-5'-deoxy-5'-iodo-4'-methoxy-uridine (1 mmole) is dissolved in 25 ml. of methanol containing sodium methoxide (2 mmoles). After 18 hours at 20°C., the reaction mixture is neutralized by the addition of an ion exchange resin (Amberlite IRC 50 COO⁻H⁺). The reaction mixture is then filtered, the resin is thoroughly washed with methanol, and the combined filtrate and washings are evaporated to dryness. The residue is purified by chromatography over silica gel to separate the main fraction consisting of 5'-deoxy-5'-iodo-4'-methoxy-uridine from trace amounts of 1-(5-deoxy-5-iodo-4-methoxy-α-L-lyxofranosyl)-uracil.

EXAMPLE 12

1-(5-deoxy-5-iodo-4-methoxy-β-D-ribofuranosyl)pyrimidines and
9-(5-deoxy-5-iodo-4-methoxy-β-D-ribofuranosyl) purines Repeating the procedure of Example 11 but replacing 2',3'-O-carbonyl-5'-deoxy-5'-iodo-4'-methoxy-uridine with 2',3'-O-carbonyl-5'-deoxy-5'-iodo-4'-methoxy-5-fluorouridine,
2',3'-O-carbonyl-5'-deoxy-5'-iodo-4'-methoxy-5-butyluridine, 2',3'-O-carbonyl-5'-deoxy-5'-iodo-4'-methoxy-5-trifluoromethyluridine,
2',3'-O-carbonyl-5'-deoxy-5'-iodo-4'-methoxy-5-nitrouridine,
2',3'-O-carbonyl-5'-deoxy-5'-iodo-4'-methoxy-5-methylaminouridine,
2',3'-O-carbonyl-5'-deoxy-5'-iodo-4'-methoxy-5-dimethylaminouridine,
2',3'-O-carbonyl-5'-deoxy-5'-iodo-4'-methoxy-6-azauridine,
2',3'-O-carbonyl-5'-deoxy-5'-iodo-4'-methoxy-6-aza-5-methyluridine,
N⁴-acetyl-2',3'-O-carbonyl-5'-deoxy-5'-iodo-4'-methoxy-cytidine,
N⁴-acetyl-2',3'-O-carbonyl-5'-deoxy-5'-iodo-4'-methoxy-5-fluorocytidine,
N⁴-acetyl-2',3'-O-carbonyl-5'-deoxy-5'-iodo-4'-methoxy-5-butylcytidine,
N⁴-acetyl-2',3'-O-carbonyl-5'-deoxy-5'-iodo-4'-methoxy-5-trifluoromethylcytidine,
N⁴-acetyl-2',3'-O-carbonyl-5'-deoxy-5'-iodo-4'-methoxy-5-nitrocytidine,
N⁴-acetyl-2',3'-O-carbonyl-5'-deoxy-5'-iodo-4'-methoxy-5-methylaminocytidine,
N⁴-acetyl-2',3'-O-carbonyl-5'-deoxy-5'-iodo-4'-methoxy-5-dimethylaminocytidine,
N⁴-acetyl-2',3'-O-carbonyl-5'-deoxy-5'-iodo-4'-methoxy-6-azacytidine,
N⁴-acetyl-2',3'-O-carbonyl-5'-deoxy-5'-iodo-4'-methoxy-6-aza-5-methylcytidine,
N¹,N⁶-dibenzoyl-2',3'-O-carbonyl-5'-deoxy-5'-iodo-4'-methoxy-adenosine,
N¹,N⁶-dibenzoyl-2',3'-O-carbonyl-5'-deoxy-5'-iodo-4'-methoxy-2-fluoroadenosine,
N¹,N⁶-dibenzoyl-2',3'-O-carbonyl-5'-deoxy-5'-iodo-4'-methoxy-2-azaadenosine,
N¹,N⁶-dibenzoyl-2',3'-O-carbonyl-5'-deoxy-5'-iodo-4'-methoxy-7-deazaadenosine,
N¹,N⁶-dibenzoyl-2',3'-O-carbonyl-5'-deoxy-5'-iodo-4'-methoxy-8-azaadenosine,
N¹,N⁶-dibenzoyl-2',3'-O-carbonyl-5'-deoxy-5'-iodo-4'-methoxy-8-aza-9-deazaadenosine,
N¹,N⁶-dibenzoyl-2'-3'-O-carbonyl-5'-deoxy-5'-iodo-4'-methoxy-7-deaza-7-cyanoadenosine,
N⁶-benzoyl-N⁶-methyl-2',3'-O-carbonyl-5'-deoxy-5'-iodo-4'-methoxy-adenosine,
N⁶-dimethyl-2',3'-O-carbonyl-5'-deoxy-5'-iodo-4'-methoxy-adenosine,
N²-acetyl-2',3'-O-carbonyl-5'-deoxy-5'-iodo-4'-methoxy-guanosine,
N²-acetyl-2',3'-O-carbonyl-5'-deoxy-5'-iodo-4'-methoxy-8-azaguanosine,
N²-acetyl-2',3'-O-carbonyl-5'-deoxy-5'-iodo-4'-methoxy-7-deazaguanosine, N⁶-acetyl-2',3'-O-carbonyl-5'-deoxy-5'-iodo-4'-methoxy-isoguanosine,
2',3'-O-carbonyl-5'-deoxy-5'-iodo-4'-methoxy-inosine, and
2',3'-O-carbonyl-5'-deoxy-5'-iodo-4'-methoxyxanthosine yields the corresponding 5'-deoxy-5'-iodo-4'-methoxy-5-fluorouridine,
5'-deoxy-5'-iodo-4'-methoxy-5-butyluridine,
5'-deoxy-5'-iodo-4'-methoxy-5-trifluoromethyluridine,
5'-deoxy-5'-iodo-4'-methoxy-5-nitrouridine,
5'-deoxy-5'-iodo-4'-methoxy-5-methylaminouridine,
5'-deoxy-5'-iodo-4'-methoxy-5-dimethylaminouridine,
5'-deoxy-5'-iodo-4'-methoxy-6-azauridine,
5'-deoxy-5'-iodo-4'-methoxy-6-aza-5-methyluridine,
5'-deoxy-5'-iodo-4'-methoxy-cytidine,
5'-deoxy-5'-iodo-4'-methoxy-5-fluorocytidine,
5'-deoxy-5'-iodo-4'-methoxy-5-butylcytidine,
5'-deoxy-5'-iodo-4'-methoxy-5-trifluoromethylcytidine,
5'-deoxy-5'-iodo-4'-methoxy-5-nitrocytidine,
5'-deoxy-5'-iodo-4'-methoxy-5-methylaminocytidine,
5'-deoxy-5'-iodo-4'-methoxy-5-dimethylaminocytidine,
5'-deoxy-5'-iodo-4'-methoxy-6-azacytidine,
5'-deoxy-5'-iodo-4'-methoxy-6-aza-5-methylcytidine,
5'-deoxy-5'-iodo-4'-methoxy-adenosine,
5'-deoxy-5'-iodo-4'-methoxy-2-fluoroadenosine,
5'-deoxy-5'-iodo-4'-methoxy-2-azaadenosine,
5'-deoxy-5'-iodo-4'-methoxy-7-deazaadenosine,
5'-deoxy-5'-iodo-4'-methoxy-8-azaadenosine,
5'-deoxy-5'-iodo-4'-methoxy-8-aza-9-deazaadenosine,
5'-deoxy-5'-iodo-4'-methoxy-7-deaza-7-cyanoadenosine,
N⁶-methyl-5'-deoxy-5'-iodo-4'-methoxy-adenosine,
N⁶-dimethyl-5'-deoxy-5'-iodo-4'-methoxy-adenosine,
5'-deoxy-5'-iodo-4'-methoxy-guanosine,
5'-deoxy-5'-iodo-4'-methoxy-8-azaguanosine,
5'-deoxy-5'-iodo-4'-methoxy-7-deazaguanosine,
5'-deoxy-5'-iodo-4'-methoxy-isoguanosine,
5'-deoxy-5'-iodo-4'-methoxy-inosine, and
5'-deoxy-5'-iodo-4'-methoxy-xanthosine.

EXAMPLE 13

1-(5-deoxy-5-iodo-4-methoxy-α-L-lyxofuranosyl)-uracil

5'-deoxy-5'-iodo-4'-methoxy-uridine (1 mmole) is dissolved in 50 ml. of 0.1N hydrochloric acid in methanol and the equilibration is followed by thin layer chromatography. After 24 hours, most of the starting material has been converted to the α-L-lyxo isomer. The reaction mixture is then neutralized with concentrated ammonium hydroxide and the lyxo isomer is purified by chromatography over silica gel to yield 1-(5-deoxy-5-iodo-4-methoxy-α-L-lyxofuranosyl)-uracil.

Repeating the above procedure with compounds obtained in Examples 11 and 12 yields the corresponding α-L-lyxo isomers.

EXAMPLE 14

3'-O-benzoyl-2'-deoxy-uridine

2'-deoxyuridine (10 mmoles) is dissolved in 10 ml. of dry pyridine and monomethoxy trityl chloride (11 mmoles) is added. After 20 hours at 20°C., benzoyl chloride (11 mmoles) is added and the reaction mixture is held at 20°C. for another 20 hrs. The solvents are then removed by evaporation and the residue is dissolved in 500 ml. of a 20 percent aqueous acetic acid solution. After 5 hours at 20°C. the reaction mixture is evaporated to dryness at 30°C. under high vacuum. The residue is leached with hot benzene and ether and is then purified by chromatography over silica gel. The main nucleoside fraction is concentrated to a syrup, thoroughly dried by repeated evaporation from dimethylformamide and crystallized from ethanol to yield 3'-O-benzoyl-2'-deoxyuridine.

EXAMPLE 15

3'-O-benzoyl-2'-5'-dideoxy-5'-iodo-uridine

The 3'-O-benzoyl-2'-deoxyuridine prepared in Example 14 is dissolved in 10 ml. of dimethylformamide and methyltriphenoxyphosphonium iodide (1.2 equivalent) is added. After 5 hours at 20°C the reaction mixture is evaporated to dryness. The resulting residue is partitioned between ethyl acetate and a 10 percent aqueous sodium thiosulfate solution. The organic layer is washed with water, dried with magnesium sulfate, filtered and evaporated to dryness. The resulting residue is purified by chromatography over silica gel and the main nucleoside fraction evaporated to dryness to yield 3'-O-benzoyl-2'-5'-dideoxy-5'-iodouridine.

EXAMPLE 16

1-(3-O-benzoyl-2-5-dideoxy-β-D-glycero-pent-4-enofuranosyl)-uracil

The 3'-O-benzoyl-2',5'-dideoxy-5'-iodo-uridine prepared in Example 15 is dissolved in dry pyridine (10 ml. mmole of nucleoside) and silver fluoride (2.5 equivalents) is added. The suspension is stirred vigorously for 4 days in the dark at 20°C. and then filtered. The filtrate is evaporated to a thin syrup and then partitioned between ethyl acetate and water. The two-phase system is filtered through Celite and the organic layer separated, dried over magnesium sulfate, filtered and evaporated to dryness. The resulting residue is purified over silica gel to yield 1-(3-O-benzoyl-2 ,5 -dideoxy-β-D-glycero-pent-4-enofuranosyl) uracil.

EXAMPLE 17

1-(3 -O-benzoyl-2 ,5 -dideoxy-β-D-glycero-pent-4-enofuranosyl)-pyrimidines

Repeating the procedures of Examples 14–16 in sequence but replacing 2'-deoxyuridine in Example 14 with 2'-deoxy-5-fluorouridine,
2'-deoxy-5-butyluridine,
2'-deoxy-5-trifluoromethyluridine,
2'-deoxy-5- nitrouridine,
2'-deoxy-5-methylaminouridine,
2'-deoxy-5-dimethylaminouridine,
2'-deoxy-6-azauridine,
2'-deoxy-6-aza-5-methyluridine,
N⁴-benzoyl-2'-deoxy-cytidine, N⁴-benzoyl-2'-deoxy-5-fluorocytidine,
N⁴-benzoyl-2'-deoxy-5-butylcytidine,
N⁴-benzoyl-2'-deoxy-5-trifluoromethylcytidine,
N⁴-benzoyl-2'-deoxy-5-nitrocytidine,
N⁴-benzoyl-2'-deoxy-5-methylaminocytidine,
N⁴-benzoyl-2'-deoxy-5-dimethylaminocytidine,
N⁴-benzoyl-2'-deoxy-6-azacytidine,
N⁴-benzoyl-2'-deoxy-6-aza-5-methylcytidine,
yields the corresponding
  1-(3-O-benzoyl-2,5-dideoxy-β-D-glycero-pent-4-enofuranosyl)-5-fluorouracil,
  1-(3-O-benzoyl-2,5-dideoxy-β-D-glycero-pent-4-enofuranosyl)-5-butyluracil,
  1-(3-O-benzoyl-2,5-dideoxy-β-D-glycero-pent-4-enofuranosyl)-5-trifluoromethyluracil,
  1-(3-O-benzoyl-2,5-dideoxy-β-D-glycero-pent-4-enofuranosyl)-5-nitrouracil,
  1-(3-O-benzoyl-2,5-dideoxy-β-D-glycero-pent-4-enofuranosyl)-5-methylaminouracil,
  1-(3-O-benzoyl-2,5-dideoxy-β-D-glycero-pent-4-enofuranosyl)-5-dimethylaminouracil,
  1-(3-O-benzoyl-2,5-dideoxy-β-D-glycero-pent-4-enofuranosyl)-6-azauracil,
  1-(3-O-benzoyl-2,5-dideoxy-β-D-glycero-pent-4-enofuranosyl)-6-aza-5-methyluracil,
  N⁴-benzoyl-1-(3-O-benzoyl-2,5-dideoxy-β-D-glyceropent-4-enofuranosyl)-cytosine,
  N⁴-benzoyl-1-(3-O-benzoyl-2,5-dideoxy-β-D-glyceropent-4-enofuranosyl)-5-fluorocytosine,
  N⁴-benzoyl-1-(3-O-benzoyl-2,5-dideoxy-β-D-glyceropent-4-enofuranosyl)-5-butylcytosine,
  N⁴-benzoyl-1-(3-O-benzoyl-2,5-dideoxy-β-D-glyceropent-4-enofuranosyl)-5-trifluoromethylcytosine,
  N⁴-benzoyl-1-(3-O-benzoyl-2,5-dideoxy-β-D-glyceropent-4-enofuranosyl)-5-nitrocytosine,
  N⁴-benzoyl-1-(3-O-benzoyl-2,5-dideoxy-β-D-glyceropent-4-enofuranosyl)-5-methylaminocytosine,
  N⁴-benzoyl-1-(3-O-benzoyl-2,5-dideoxy-β-D-glyceropent-4-enofuranosyl)-5-dimethylaminocytosine,
  N⁴-benzoyl-1-(3-O-benzoyl-2,5-dideoxy-β-D-glyceropent-4-enofuranosyl)-6-azacytosine, and
  N⁴-benzoyl-1-(3-O-benzoyl-2,5-dideoxy-β-D-glyceropent-4-enofuranosyl)-6-aza-5-methylcytosine.

EXAMPLE 18

N⁴-benzoyl-1-(β-D-arabinofuranosyl)-cytosine 1-(β-D-arabinofuranosyl)-cytosine (1 mmole) is suspended in 25 ml. of dry ethanol and 250 mg. of benzoic anhydride is added. The reaction mixture is stirred at reflux and 500 mg. of benzoic anhydride is added at 1 hour intervals until 2.5 g. has been added. After the final addition the solution is refluxed for 1 hour, cooled and evaporated under vacuum. Trituration of the resulting syrupy residue with ether affords crystals. The suspension is filtered and the solid triturated three times with 50 ml. portions of warm ether. The residue is evaporated to dryness to yield N⁴-benzoyl-1-(β-D-arabinofuranosyl)-cytosine.

EXAMPLE 19

N⁴-benzoyl-1-(β-D-arabinofuranosyl)-cytosines

Repeating the procedure of Example 23 but replacing 1-(β-D-arabinofuranosyl)-cytosine with
  1-(β-D-arabinofuranosyl)-5-fluorocytosine,
  1-(β-D-arabinofuranosyl)-5-butylcytosine,
  1-(β-D-arabinofuranosyl)-5-trifluoromethylcytosine,
  1-(β-D-arabinofuranosyl)-5-nitrocytosine,
  1-(β-D-arabinofuranosyl)-5-methylaminocytosine,
  1-(β-D-arabinofuranosyl)-5-dimethylaminocytosine,
  1-(β-D-arabinofuranosyl)-6-azacytosine, and
  1-(β-D-arabinofuranosyl)-6-aza-5-methylcytosine.
yields the corresponding
  N⁴-benzoyl-1-(β-D-arabinofuranosyl)-5-fluorocytosine,
  N⁴-benzoyl-1-(β-D-arabinofuranosyl)-5-butylcytosine,
  N⁴-benzoyl-1-(β-D-arabinofuranosyl)-5-trifluoromethylcytosine,
  N⁴-benzoyl-1-(β-D-arabinofuranosyl)-5-nitrocytosine,
  N⁴-benzoyl-1-(β-D-arabinofuranosyl)-5-methylaminocytosine,
  N⁴-benzoyl-1-(β-D-arabinofuranosyl)-5-dimethylaminocytosine,
  N⁴-benzoyl-1-(β-D-arabinofuranosyl)-6-azacytosine, and
  N⁴-benzoyl-1-(β-D-arabinofuranosyl)-6-aza-5-methylcytosine.

EXAMPLE 20

N¹, N⁶-dibenzoyl-9(2,3-di-O-benzoyl-β-D-arabinofuranosyl)-adenine 9-(β-D-arabinofuranosyl)-adenine (10 mmoles) is dissolved in 200 ml. of dry pyridine and monomethoxy trityl chloride (11 mmoles) is added. After 20 hours at 20° C., benzoyl chloride (80 mmoles) is added and the reaction is held at 20°C. for another 20 hours. The excess reagent is destroyed by the addition of water and the reaction mixture is evaporated to dryness under vacuum. The residue is partitioned between chloroform and water and the organic layer is evaporated to dryness. The resulting residue is then dissolved in 500 ml. of a mixture of acetic acid and water (8:2). After 5 hours at 20°C the solvents are removed under reduced pressure and low temperature (i.e. 20°-30°C). The residue is purified by chromatography over silica gel and the major nucleoside fraction is evaporated to dryness to yield N¹,N⁶-dibenzoyl-9(2,3-di-O-benzoyl-β-D-arabinofuranosyl)-adenine.

EXAMPLE 21

N¹,N⁶-dibenzoyl-9-(2,3-di-O-benzoyl-5-deoxy-5-iodo-β-D-arabinofuranosyl)-adenine.

The N¹,N⁶-dibenzoyl-9-(2,3-di-O-benzoyl-β-D-arabinofuranosyl)-adenine prepared in Example 20 is dissolved in 10 ml. of dry methylene chloride and the solution is cooled to −70°C. Methyltriphenoxyphosphonium iodide (1.5 equivalents) is then added in a dry nitrogen atmosphere and the reaction mixture is allowed to warm to 20°C. Two hours after the addition of methyltriphenoxyphosphonium iodide, methanol (10 equivalents) is added to decompose excess reagent. The solvents are evaporated under vacuum at 30°C and the residue is partitioned between chloroform and water. The chloroform layer is successively washed with a 10 percent aqueous solution of sodium thiosulfate and water, dried over magnesium sulfate, filtered and evaporated to dryness. The residue is purified by chromatography over silica gel and the major nucleoside fraction evaporated to dryness to yield $N^1,N^6$-dibenzoyl-9-(2,3-di-O-benzoyl-5-deoxy-5-iodo-β-D-arabinofuranosyl)-adenine.

EXAMPLE 22

$N^1,N^6$-dibenzoyl-9-(2,3-di-O-benzoyl-5-deoxy-β-D-threopent-4-enofuranosyl)-adenine The $N^1,N^6$-dibenzoyl-9-(2,3-di-O-benzoyl-5-deoxy-5-iodo-β-D-arabinofuranosyl)-adenine prepared in Example 21 is dissolved in 100 ml. of dry dimethylformamide containing 1,5-diazabicyclo-[4.3.0]-non-5-ene (2 equivalents). The reaction temperature is held at 20°C. and the reaction is monitored by thin-layer chromatography. After all the 5′-iodo nucleoside starting material has been converted to the 4′-5′-unsaturated product (i.e. 2–48 hours) the reaction mixture is evaporated to dryness. The residue is purified by chromatography over silica gel to yield $N^1,N^6$-dibenzoyl-9-(2,3-di-O-benzoyl-5-deoxy-β-D-threo-pent-4-enofuranosyl)-adenine.

EXAMPLE 23

1-(2,3-di-O-benzoyl-5-deoxy-β-D-threo-pent-4-enofuranosyl) pyrimidines, and
9-(2,3-di-O-benzoyl-5-deoxy-β-D-threo-pent-4-enofuranosyl)-purines Repeating the procedures of Examples 20 to 22 but replacing 9-(β-D-arabinofuranosyl)-adenine in Example 20 with 1-(β-D-arabinofuranosyl)-uracil,
1-(β-D-arabinofuranosyl)-5-fluorouracil,
1-(β-D-arabinofuranosyl)-5-alkyluracil,
1-(β-D-arabinofuranosyl)-5-trifluoromethyluracil,
1-(β-D-arabinofuranosyl)-5-nitrouracil,
1-(β-D-arabinofuranosyl)-5-methylaminouracil,
1-(β-D-arabinofuranosyl)-6-azauracil,
1-(β-D-arabinofuranosyl)-6-aza-5-methyluracil,
1-(β-D-arabinofuranosyl)-cytosine,
1-(β-D-arabinofuranosyl)-5-fluorocytosine,
1-(β-D-arabinofuranosyl)-5-alkylcytosine
1-(β-D-arabinofuranosyl)-5-trifluoromethylcytosine,
1-(β-D-arabinofuranosyl)-5-nitrocytosine,
1-(β-D-arabinofuranosyl)-5-methylaminocytosine,
1-(β-D-arabinofuranosyl)-5-dimethylaminocytosine,
1-(β-D-arabinofuranosyl)-6-azacytosine,
1-(β-D-arabinofuranosyl)-6-aza-5-methylcytosine,
9-(β-D-arabinofuranosyl)-2-fluoroadenine,
9-(β-D-arabinofuranosyl)-2-azaadenine,
9-(β-D-arabinofuranosyl)-7-deazaadenine,
9-(β-D-arabinofuranosyl)-8-azaadenine,
9-(β-D-arabinofuranosyl)-8-aza-9-deazaadenine,
9-(β-D-arabinofuranosyl)-7-deaza-7-cyanodenine,
$N^6$-methyl-9-(β-D-arabinofuranosyl)-adenine,
$N^6$-dimethyl-9-(β-D-arabinofuranosyl)-adenine,
9-(β-D-arabinofuranosyl)-guanine,
9-(β-D-arabinofuranosyl)-8-azaguanine,
9-(β-D-arabinofuranosyl)-7-deazaguanine,
9-(β-D-arabinofuranosyl)-isoguanine,
9-(β-D-arabinofuranosyl)-hypoxanthine, and
9-(β-D-arabinofuranosyl)-xanthine
yields the corresponding 1-(2,3-di-O-benzoyl-5-deoxy-β-D-threo-pent-4-enofuranosyl)-uracil,
1-(2,3-di-O-benzoyl-5-deoxy-β-D-threo-pent-4-enofuranosyl)-5-fluorouracil,
1-(2,3-di-O-benzoyl-5-deoxy-β-D-threo-pent-4-enofuranosyl)-5-butyluracil,
1-(2,3-di-O-benzoyl-5-deoxy-β-D-threo-pent-4-enofuranosyl)-5-trifluoromethyluracil,
1-(2,3-di-O-benzoyl-5-deoxy-β-D-threo-pent-4-enofuranosyl)-5-nitrouracil,
1-(2,3-di-O-benzoyl-5-deoxy-β-D-threo-pent-4-enofuranosyl)-5-methylaminouracil,
1-(2,3-di-O-benzoyl-5-deoxy-β-D-threo-pent-4-enofuranosyl)-5-dimethylaminouracil,
1-(2,3-di-O-benzoyl-5-deoxy-β-D-threo-pent-4-enofuranosyl)-6-azauracil,
1-(2,3-di-O-benzoyl-5-deoxy-β-D-threo-pent-4-enofuranosyl)-6-aza-5-methyluracil,
$N^4$-benzoyl-1-(2,3-di-O-benzoyl-5-deoxy-β-D-threo-pent-4-enofuranosyl)-cytosine,
$N^4$-benzoyl-1-(2,3-di-O-benzoyl-5-deoxy-β-D-threo pent-4-enofuranosyl)-5-fluorocytosine,
$N^4$-benzoyl-1-(2,3-di-O-benzoyl-5-deoxy-β-D-threo pent-4-enofuranosyl)-5-butylcytosine,
$N^4$-benzoyl-1-(2,3-di-O-benzoyl-5-deoxy-β-D-threo pent-4-enofuranosyl)-5-trifluoromethylcytosine,
$N^4$-benzoyl-1-(2,3-di-O-benzoyl-5-deoxy-β-D-threo pent-4-enofuranosyl)-5-nitrocytosine,
$N^4$-benzoyl-1-(2,3-di-O-benzoyl-5-deoxy-β-D-threo pent-4-enofuranosyl)-5-methylaminocytosine,
$N^4$-benzoyl-1-(2,3-di-O-benzoyl-5-deoxy-β-D-threo pent-4-enofuranosyl)-6-azacytosine,
$N^4$-benzoyl-1-(2,3-di-O-benzoyl-5-deoxy-β-D-threo pent-4-enofuranosyl)-6-aza-5-methylcytosine,
$N^1,N^6$-dibenzoyl-9-(2,3-di-O-benozyl-5-deoxy-β-D-threo-pent-4-enofuranosyl)-2-fluoroadenine,
$N^1,N^6$-dibenzoyl-9-(2,3-di-O-benzoyl-5-deoxy-β-D-threo-pent-4-enofuranosyl)-2-azaadenine,
$N^1,N^6$-dibenzoyl-9-(2,3-di-O-benzoyl-5-deoxy-β-D-threo-pent-4-enofuranosyl)-7-deazaadenine,
$N^1,N^6$-dibenzoyl-9-(2,3-di-O-benzoyl-5-deoxy-β-D-threo-pent-4-enofuranosyl-8-azadiene,
$N^1,N^6$,dibenzoyl-9-(2,3-di-O-benzoyl-5-deoxy-β-D-threo-pent-4-enofuranosyl)-8-aza-9-deazaadenine,
$N^1,N^6$,dibenzoyl-9-(2,3-di-O-benzoyl-5-deoxy-β-D-threo-pent-4-enfuranosyl)-7-deaza-7-cyanoadenine,
$N^6$-benzoyl-$N^6$-methyl-9-(2,3-di-O-benzoyl-5-deoxy-β-D-threo-pent-4-enofuranosyl)-adenine,
$N^6$-dimethyl-9-(2,3-di-O-benzoyl-5-deoxy-β-D-threo-pent-4-enofuranosyl)-adenine,
$N^2$-acetyl-9-(2,3-di-O-benzoyl-5-deoxy-β-D-threo-pent-4-enofuranosyl)-guanine,
$N^2$-acetyl-9-(2,3-di-O-benzoyl-5-deoxy-β-D-threo-pent-4-enofuranosyl)-8-aza-guanine,
$N^2$-acetyl-9-(2,3-di-O-benzoyl-5-deoxy-β-D-threo-pent-4-enofuranosyl)-7-deazaguanine,
$N^6$-acetyl-9-(2,3-di-O-benzoyl-5-deoxy-β-D-threo-pent-4-enofuranosyl)-isoguanine,
9-(2,3-di-O-benzoyl-5-deoxy-β-D-threo-pent-4-enofuranosyl)-hypoxanthine, and
9-(2,3-di-O-benzoyl-5-deoxy-β-D-threo-pent-4-enofuranosyl)-xanthine.

EXAMPLE 24

N⁴-benzoyl-1-(2,5-dideoxy-β-D-glycero-pent-4-enofuranosyl)cytosine.

N⁴-benzoyl-1-(3-O-benzoyl-2,5-dideoxy-β-D-glycero-pent-4-enofuranosyl)cytosine (1 mmole) is dissolved in 12.5 ml. of a mixture of ethanol and pyridine (1.5:1). To this solution, 20 ml of a mixture of 2N NaOH and ethanol (1:1) is added and the hydrolysis is continued for 5 minutes at 20°C. Dowex 50 ion-exchange resin in the pyridinium form (30 equivalents) is then added and the suspension is stirred for 15 minutes at 20°C and then filtered. The resin is washed with ethanol and the combined filtrate and washings are evaporated to dryness. The residue is leached with warm ether to remove benzoic acid and then purified by chromatography over silica gel to yield N⁴-benzoyl-1-(2,5-dideoxy-β-D-glycero-pent-4-enofuranosyl)-cytosine.

EXAMPLE 25

1-(2,5-dideoxy-β-D-glycero-pent-4-enofuranosyl)-pyrimidines,
1-(5-deoxy-β-D-threo-pent-4-enofuranosyl)-pyrimidines and
9-(5-deoxy-β-D-threo-pent-4-enofuranosyl)-purines Repeating the procedure of Example 24 put replacing N⁴-benzoyl-1-(3-O-benzoyl-2,5-dideoxy-β-D-glycero-pent-4-enofuranosyl)-cytosine with 1-(3-O-benzoyl-2,5-dideoxy-β-D-glycero-pent-4-enofuranosyl)-uracil,
1-(3-O-benzoyl-2,5-dideoxy-β-D-glycero-pent-4-enofuranosyl)-5-fluorouracil,
1-(3-O-benzoyl-2,5-dideoxy-β-D-glycero-pent-4-enofuranosyl)-5-butyluracil,
1-(3-O-benzoyl-2,5-dideoxy-β-D-glycero-pent-4-enofuranosyl)-5-trifluoromethyluracil,
1-(3-O-benzoyl-2,5-dideoxy-β-D-glycero-pent-4-enofuranosyl)-5-nitrouracil,
1-(3-O-benzoyl-2,5-dideoxy-β-D-glycero-pent-4-enofuranosyl)-5-methylaminouracil,
1-(3-O-benzoyl-2,5-dideoxy-β-D-glycero-pent-4-enofuranosyl)-5-dimethylaminouracil,
1-(3-O-benzoyl-2,5-dideoxy-β-D-glycero-pent-4-enofuranosyl-6-azauracil,
1-(3-O-benzoyl-2,5-dideoxy-β-D-glycero-pent-4-enofuranosyl)-6-aza-5-methyluracil,
N⁴-benzoyl-1(3-O-benzoyl-2,5-dideoxy-β-D-glycero-pent-4-enofuranosyl)-5-fluorocytosine,
N⁴-benzoyl-1-(3-O-benzoyl-2,5-dideoxy-β-D-glycero-pent-4-enofuranosyl)-5-butylcytosine,
N⁴-benzoyl-1-(3-O-benzoyl-2,5-dideoxy-β-D-glycero-pent-4-enofuranosyl)-5-trifluoromethylcytosine,
N⁴-benzoyl-1-(3-O-benzoyl-2,5-dideoxy-β-D-glycero-pent-4-enofuranosyl)-5-nitrocytosine,
N⁴-benzoyl-1-(3-O-benzoyl-2,5-dideoxy-β-D-glycero-pent-4-enofuranosyl)-5-methylaminocytosine,
N⁴-benzoyl-1-(3-O-benzoyl-2,5-dideoxy-β-D-glycero-pent-4-enofuranosyl)-5-dimethylaminocytosine,
N⁴-benzoyl-1-(3-O-benzoyl-2,5-dideoxy-β-D-glycero-pent-4-enofuranosyl)-6-azacytosine,
N⁴-benzoyl-1-(3-O-benzoyl-2,5-dideoxy-β-D-glycero-pent-4-enofuranosyl)-6-aza-5-methylcytosine,
1-(2,3-di-O-benzoyl-5-deoxy-β-B-threo-pent-4-enofuranosyl)-uracil,
1-(2,3-di-O-benzoyl-5-deoxy-β-D-threo-pent-4-enofuranosyl)-5-fluorouracil,
1-(2,3-di-O-benzoyl-5-deoxy-β-D-threo-pent-4-enofuranosyl)-5-butyluracil,
1-(2,3-di-O-benzoyl-5-deoxy-β-D-threo-pent-4-enofuranosyl)-5-trifluoromethyluracil,
1-(2,3-di-O-benzoyl-5-deoxy-β-D-threo-pent-4-enofuranosyl)-5-nitrouracil,
1-(2,3-di-O-benzoyl-5-deoxy-β-D-threo-pent-4-enofuranosyl)-5-methylaminouracil,
1-(2,3-di-O-benzoyl-5-deoxy-β-D-threo-pent-4-enofuranosyl)-5-dimethylaminouracil,
1-(2,3-di-O-benzoyl-5-deoxy-β-D-threo-pent-4-enofuranosyl)-6-azauracil,
1-(2,3-di-O-benzoyl-5-deoxy-β-D-threo-pent-4-enofuranosyl)-6-aza-5-methyluracil,
N⁴-benzoyl-1-(2,3-di-O-benzoyl-5-deoxy-β-D-threo-pent-4-enofuranosyl)-cytosine,
N⁴-benzoyl-1-(2,3-di-O-benzoyl-5-deoxy-β-D-threo-pent-4-enofuranosyl)-5-fluorocytosine,
N⁴-benzoyl-1-(2,3-di-O-benzoyl-5-deoxy-β-D-threo pent-4-enofuranosyl)-5-butylcytosine,
N⁴-benzoyl-1-(2,3-di-O-benzoyl-5-deoxy-β-D-threo-pent-4-enofuranosyl)-5-trifluoromethylcytosine,
N⁴-benzoyl-1-(2,3-di-O-benzoyl-5-deoxy-β-D-threo-pent-4-enofuranosyl)-5-nitrocytosine,
N⁴-benzoyl-1-(2,3-di-O-benzoyl-5-deoxy-β-D-threo-pent-4-enofuranosyl)-5-methylaminocytosine,
N⁴-benzoyl-1-(2,3-di-O-benzoyl-5-deoxy-β-D-threo-pent-4-enofuranosyl-dimethylaminocytosine,
N⁴-benzoyl-1-(2,3-di-O-benzoyl-5-deoxy-β-D-threo-pent-4-enofuranosyl)-6-azacytosine,
N⁴-benzoyl-1-(2,3-di-O-benzoyl-5-deoxy-β-D-threo-pent-4-enofuranosyl)6-aza-5-methylcytosine,
N⁶-benzoyl-9-(2,3-di-O-benzoyl-5-deoxy-β-D-threo-pent-4-enofuranosyl)-adenine
N⁶-benzoyl-9-(2,3-di-O-benzoyl-5-deoxy-β-D-threo-pent-4-enofuranosyl)-2-fluoroadenine,
N⁶-benzoyl-9-(2,3-di-O-benzoyl-5-deoxy-β-D-threo-pent-4-enofuranosyl)-2-azaadenine,
N⁶-benzoyl-9-(2,3-di-O-benzoyl-5-deoxy-β-D-threo-pent-4-enofuranosyl)-7-deazaadenine,
N⁶-benzoyl-9-(2,3-di-O-benzoyl-5-deoxy-β-D-threo-pent-4-enofuranosyl)-8-azaadenine,
N⁶-benzoyl-9-(2,3-di-O-benzoyl-5-deoxy-β-D-threo-pent-4-enofuranosyl)-8-aza-9-deazaadenine,
N⁶-benzoyl-9-(2,3-di-O-benzoyl-5-deoxy-β-D-threo-pent-4-enofuranosyl)-7-deaza-7-cyanoadenine,
N⁶-benzoyl-N⁶-methyl-9-(2,3-di-O-benzoyl-5-deoxy-β-D-threo-pent-4-enofuranosyl)-adenine,
N⁶-dimethyl-9-(2,3-di-O-benzoyl-5-deoxy-β-D-threo-pent-4-enofuranosyl)-adenine,
N²-benzoyl-9-(2,3-di-O-benzoyl-5-deoxy-β-D-threo-pent-4-enofuranosyl)-guanine,
N²-benzoyl-9-(2,3-di-O-benzoyl-5-deoxy-β-D-threo-pent-4-enofuranosyl)-8-azaguanine,
N²-benzoyl-9-(2,3-di-O-benzoyl-5-deoxy-β-D-threo-pent-4-enofuranosyl)-7-deazaguanine,
N⁶-benzoyl-9-(2,3-di-O-benzoyl-5-deoxy-β-D-threo-pent-4-enofuranosyl)-isoguanine,
9-(2,3-di-O-benzoyl-5-deoxy-β-D-threo-pent-4-enofuranosyl)-hypoxanthine, and
9-(2,3-di-O-benzoyl-5-deoxy-β-D-threo-pent-4-enofuranosyl)-xanthine, yields the corresponding 1-(2,5-dideoxy-β-D-glycero-pent-4-enofuranosyl)-uracil, 1-(2,5-dideoxy-β-D-glycero-pent-4-enofuranosyl)-5-fluorouracil, 1-(2,5-dideoxy-β-D-glycero-pent-4-enofuranosyl)-5-butyluracil 1-(2,5-dideoxy-β-D-glycero-pent-4-enofuranosyl)-5-trifluoromethyluracil, 1-(2,5-dideoxy-β-D-glycero-pent-4-enofuranosyl)-5-nitrouracil, 1-(2,5-dideoxy-β-D-glycero-pent-4-enofuranosyl)-5-methyl-aminouracil, 1-(2,5-dideoxy-β-D-glycero-pent-4-enofuranosyl)-5-dimethyl-aminouracil, 1-(2,5-dideoxy-β-D-glycero-pent-4-enofuranosyl)-6-azauracil, 1-(2,5-dideoxy-β-D-glycero-pent-4-enofuranosyl)-6-aza-5-methyluracil, $N^4$-benzoyl-1-(2,5-dideoxy-β-D-glycero-pent-4-enofuranosyl)-5-fluorocytosine, $N^4$-benzoyl-1-(2,5-dideoxy-β-D-glycero-pent-4-enofuranosyl)-5-butylcytosine, $N^4$-benzoyl-1-(2,5-dideoxy-β-D-glycero-pent-4-enofuranosyl)-5-trifluoromethylcytosine, $N^4$-benzoyl-1-(2,5-dideoxy-β-D-glycero-pent-4-enofuranosyl)-5-nitrocytosine, $N^4$-benzoyl-1-(2,5-dideoxy-β-D-glycero-pent-4-enofuranosyl)-5-methylaminocytosine, $N^4$-benxoyl-1-(2,5-dideoxy-β-D-glycero-pent-4-enofuranosyl)-5-dimethylaminocytosine, $N^4$-benzoyl-1-(2,5-dideoxy-β-D-glycero-pent-4-enofuranosyl)-6-azacytosine, $N^4$-benzoyl-1-(2,5-dideoxy-β-D-glycero-pent-4-enofuranosyl)-6-aza-5-methylcytosine, 1-(5-deoxy-β-D-threo-pent-4-enofuranosyl)-uracil, 1-(5-deoxy-β-D-threo-pent-4-enofuranosyl)-5-fluorouracil, 1-(5-deoxy-β-D-threo-pent-4-enofuranosyl)-5-butyluracil, 1-(5-deoxy-β-D-threo-pent-4-enofuranosyl)-5-trifluoromethyl-uracil, 1-(5-deoxy-β-D-threo-pent-4-enofuranosyl)-5-nitrouracil, 1-(5-deoxy-β-D-threo-pent-4-enofuranosyl)-5-methylaminouracil, 1-(5-deoxy-β-D-threo-pent-4-enofuranosyl)-5-dimethylaminouracil, 1-(5-deoxy-β-D-threo-pent-4-enofuranosyl)-6-azauracil, 1-(5-deoxy-β-D-threo-pent-4-enofuranosyl)-6-aza-5-methyl-uracil, $N^4$-benzoyl-1-(5-deoxy-β-D-threo-pent-4-enofuranosyl)-cytosine, $N^4$-benzoyl-1-(5-deoxy-β-D-threo-pent-4-enofuranosyl)-5-fluorocytosine, $N^4$-benzoyl-1-(5-deoxy-β-D-threo-pent-4-enofuranosyl)-5-butylcytosine, $N^4$-benzoyl-1-(5-deoxy-β-D-threo-pent-4-enofuranosyl)-5-trifluoromethylcytosine, $N^4$-benzoyl-1-(5-deoxy-β-D-threo-pent-4-enofuranosyl)-5-nitrocytosine, $N^4$-benzoyl-1-(5-deoxy-β-D-threo-pent-4-enofuranosyl)-5-methylaminocytosine, $N^4$-benzoyl-1-(5-deoxy-β-D-threo-pent-4-enofuranosyl)-5-dimethylaminocytosine, $N^4$-benzoyl-1-(5-deoxy-β-D-threo-pent-4-enofuranosyl)-6-azacytosine, $N^4$-benzoyl-1-(5-deoxy-β-D-threo-pent-4-enofuranosyl)-6-aza-5-methylcytosine, $N^6$-benzoyl-9-(5-deoxy-β-D-threo-pent-4-enofuranosyl)-adenine, $N^6$-benxoyl-9-(5-deoxy-β-D-threo-pent-4-enofuranosyl)-2-fluoroadenine, $N^6$-benzoyl-9-(5-deoxy-β-D-threo-pent-4-enofuranosyl)-2-azaadenine, $N^6$-benzoyl-9-(5-deoxy-β-D-threo-pent-4-enofuranosyl)-7-deazaadenine, $N^6$-benzoyl-9-(5-deoxy-β-D-threo-pent-4-enofuranosyl)-8-azaadenine, $N^6$-benzoyl-9-(5-deoxy-β-D-threo-pent-4-enofuranosyl)-8-aza-9-deazaadenine, $N^6$-benzoyl-9-(5-deoxy-β-D-threo-pent-4-enofuranosyl)-7-deaza-7-cyanoadenine, $N^6$-benzoyl-$N^6$-methyl-9-(5-deoxy-β-D-threo-pent-4-enofuranosyl)-adenine, $N^6$-dimethyl-9-(5-deoxy-β-D-threo-pent-4-enofuranosyl)-adenine, $N^2$-benzoyl-9-(5-deoxy-β-D-threo-pent-4-enofuranosyl)-guanine, $N^2$-benzoyl-9-(5-deoxy-β-D-threo-pent-4-enofuranosyl)-8-azaguanine, $N^2$-benzoyl-9-(5-deoxy-β-D-threo-pent-4-enofuranosyl)-7-deazaguanine, $N^6$-benzoyl-9-(5-deoxy-β-D-threo-pent-4-enofuranosyl)-isoguanine, 9-(5-deoxy-β-D-threo-pent-4-enofuranosyl)-hypoxanthine, and 9-(5-deoxy-β-D-threo-pent-4-enofuranosyl)-xanthine.

EXAMPLE 26

1-(2,5-dideoxy-5-iodo-4-methoxy-β-D-erythro-pentofuranosyl)-uracil, and 1-(2,5-dideoxy-5-iodo-4-methoxy-α-L-threo-pentofuranosyl)-uracil.

1-(2,5-dideoxy-β-D-glycero-pent-4-enofuranosyl)-uracil (1 mmole) is dissolved in 10 ml. of methanol and silver acetate (1.4 mmole) is added. To this well stirred suspension, iodine (1.4 mmole) dissolved in 10 ml. of methanol, is added dropwise over a period of 10 minutes. The reaction mixture is stirred for 30 minutes in the dark at 20°C. Sodium bicarbonate (3 mmoles) is then added and the suspension stirred for another 15 minutes. The reaction mixture is then filtered and the syrupy residue dried by co-evaporation with pyridine. The resulting residue is acetylated at 20°C. for 20 hours in 4.5 ml. of a mixture of pyridine and acetic anhydride (1.25:1). The reaction mixture is evaporated to dryness and the residue purified by preparative thin layer chromatography (silica gel) which permits separation of the erythro and threo isomers. Each isomer is then deacylated by treatment with 10 ml. of a mixture of methanol and concentrated ammonium hydroxide (1:1) at 20°C. for 20 hours. The solvents are removed by evaporation and the residue is purified by chromatography over silica gel to yield 1-(2,5-dideoxy-5-iodo-4-methoxy-β-D-erythro-pentofuranosyl)-uracil and 1-(2,5-didoexy-5-iodo-4-methoxy-α-L-threopentofuranosyl)-uracil. By replacing methanol with ethanol, 2-chloroethanol, 2,2-dichloroethanol, 2,2,2-trichloroethanol, 2-fluoroethanol, 2,2-difluoroethanol, or 2,2,2-trifluoroethanol in the above procedure, the corresponding 4'-alkoxy and 4'-haloalkoxy nucleosides were prepared.

EXAMPLE 27

1-(2,5-dideoxy-5-iodo-4-methoxy-β-D-erythro-and -α-L-threo-pentofuranosyl) pyrimidines, 1-(5-deoxy-5-iodo-4-methoxy-β-D-arabino-and α-L-xylofuranosyl) pyrimidines, and 9-(5-deoxy-5-iodo-4-methoxy-β-D-arabino-and α-L-xylofuranosyl) purines Repeating the procedure of Example 26 but replacing 1-(2,5-dideoxy-β-D-glycero-pent-4-enofuranosyl)-uracil with 1-(2,5-dideoxy-β-D-glycero-pent-4-enofuranosyl)-5-fluorouracil,
1-(2,5-dideoxy-β-D-glycero-pent-4-enofuranosyl)-5-butyluracil,
1-(2,5-dideoxy-β-D-glycero-pent-4-enofuranosyl)-5-trifluoromethyluracil,
1-(2,5-dideoxy-β-D-glycero-pent-4-enofuranosyl)-5-nitrouracil,
1-(2,5-dideoxy-β-D-glycero-pent-4-enofuranosyl)-5-methylaminouracil,
1-(2,5-dideoxy-β-D-glycero-pent-4-enofuranosyl)-5-dimethylamino-uracil,
1-(2,5-dideoxy-β-D-glycero-pent-4-enofuranosyl)-6-azauracil,
1-(2,5-dideoxy-β-D-glycero-pent-4-enofuranosyl)-6-aza-5-methyluracil,
$N^4$-benzoyl-1-(2,5-dideoxy-β-D-glycero-pent-4-enofuranosyl)-cytosine,
$N^4$-benzoyl-1-(2,5-dideoxy-β-D-glycero-pent-4-enofuranosyl)-5-fluorocytosine,
$N^4$-benzoyl-1-(2,5-dideoxy-β-D-glycero-pent-4-enofuranosyl)-5-butylcytosine,
$N^4$-benzoyl-1-(2,5-dideoxy-β-D-glycero-pent-4-enofuranosyl)-5-trifluoromethylcytosine,
$N^4$-benzoyl-1-(2,5-dideoxy-β-D-glycero-pent-4-enofuranosyl)-5-nitrocytosine,
$N^4$-benzoyl-1-(2,5-dideoxy-β-D-glycero-pent-4-enofuranosyl)-5-methylaminocytosine,
$N^4$-benzoyl-1-(2,5-dideoxy-β-D-glycero-pent-4-enofuranosyl)-5-dimethylaminocytosine,
$N^4$-benzoyl-1-(2,5-dideoxy-β-D-glycero-pent-4-enofuranosyl)-6-azacytosine,
$N^4$-benzoyl-1-(2,5-dideoxy-β-D-glycero-pent-4-enofuranosyl)-6-aza-5-methylcytosine,
1-(5-deoxy-β-D-threo-pent-4-enofuranosyl)-uracil,
1-(5-deoxy-β-D-threo-pent-4-enofuranosyl)-5-fluorouracil,
1-(5-deoxy-β-D-threo-pent-4-enofuranosyl-5-butyluracil,
1-(5-deoxy-β-D-threo-pent-4-enofuranosyl)-5-trifluoromethyluracil,
1-(5-deoxy-β-D-(threo-pent-4-enofuranosyl)-5-nitrouracil,
1-(5-deoxy-β-D-threo-pent-4-enofuranosyl)-5-methylaminouracil,
1-(5-deoxy-β-D-threo-pent-4-enofuranosyl)-5-dimethylaminouracil,
1-(5-deoxy-β-D-threo-pent-4-enofuranosyl)-6-azauracil,
1-(5-deoxy-β-D-threo-pent-4-enofuranosyl)-6-aza-5-methyluracil,
$N^4$-benzoyl-1-(5-deoxy-β-D-threo-pent-4-enofuranosyl)-cytosine,
$N^4$-benzoyl-1-(5-deoxy-β-D-threo-pent-4-enofuranosyl)-5-fluorocytosine,
$N^4$-benzoyl-1-(5-deoxy-β-D-threo-pent-4-enofuranosyl)-5-butylcytosine,
$N^4$-benzoyl-1-(5-deoxy-β-D-threo-pent-4-enofuranosyl)-5-trifluoromethylcytosine,
$N^4$-benzoyl-1-(5-deoxy-β-D-threo-pent-4-enofuranosyl)-5-nitrocytosine,
$N^4$-benzoyl-1-(5-deoxy-β-D-threo-pent-4-enofuranosyl)-5-methylaminocytosine,
$N^4$-benzoyl-1-(5-deoxy-β-D-threo-pent-4-enofuranosyl)-5-dimethylaminocytosine,
$N^4$-benzoyl-1-(5-deoxy-β-D-threo-pent-4-enofuranosyl)-6-azacytosine,
$N^4$-benzoyl-1-(5-deoxy-β-D-threo-pent-4-enofuranosyl)-6-aza-5-methylcytosine,
$N^6$-benzoyl-9-(5-deoxy-β-D-threo-pent-4-enofuranosyl)-adenine,
$N^6$-benzoyl-9-(5-deoxy-β-D-threo-pent-4-enofuranosyl)-2-fluoroadenine,
$N^6$-benzoyl-9-(5-deoxy-β-D-threo-pent-4-enofuranosyl)-2-azaadenine,
$N^6$-benzoyl-9-(5-deoxy-β-D-threo-pent-4-enofuranosyl)-7-deazaadenine,
$N^6$-benzoyl-9-(5-deoxy-β-D-threo-pent-4-enofuranosyl)-8-azaadenine,
$N^6$-benzoyl-9-(5-deoxy-β-D-threo-pent-4-enofuranosyl)-8-aza-9-deazaadenine,
$N^6$-benzoyl-$N^6$-methyl-9-(5-deoxy-β-D-threo-pent-4-enofuranosyl)-adenine,
$N^6$-dimethyl-9-(5-deoxy-β-D-threo-pent-4-enofuranosyl)-adenine,
$N^2$-benzoyl-9-(5-deoxy-β-D-threo-pent-4-enofuranosyl)-guanine,
$N^2$-benzoyl-9-(5-deoxy-β-D-threo-pent-4-enofuranosyl)-8-azaguanine,
$N^2$-benzoyl-9-(5-deoxy-β-D-threo-pent-4-enofuranosyl)-7-deazaguanine,
$N^6$-benzoyl-9-(5-deoxy-β-D-threo-pent-4-enofuranosyl)-isoguanine,
9-(5-deoxy-β-D-threo-pent-4-enofuranosyl)-hypoxanthine, and
9-(5-deoxy-β-D-threo-pent-4-enofuranosyl)-xanthine, yields the corresponding β-D-erythro isomers, e.g.,
1-(2,5-dideoxy-5-iodo-4-methoxy-β-D-erythropentofuranosyl)-5-fluorouracil,
1-(2,5-dideoxy-5-iodo-4-methoxy-β-D-erythropentofuranosyl)-5-butyluracil,
1-(2,5-dideoxy-5-iodo-4-methoxy-β-D-erythropentofuranosyl)-5-trifluoromethyluracil,
1-(2,5-dideoxy-5-iodo-4-methoxy-β-D-erythropentofuranosyl)-5-nitrouracil,
1-(2,5-dideoxy-5-iodo-4-methoxy-β-D-erythropentofuranosyl)-5-methylaminouracil,
1-(2,5-dideoxy-5-iodo-4-methoxy-β-D-erythropentofuranosyl)-5-dimethylaminouracil,
1-(2,5-dideoxy-5-iodo-4-methoxy-β-D-erythropentofuranosyl)-6-azauracil,
1-(2,5-dideoxy-5-iodo-4-methoxy-β-D-erythropentofuranosyl)-6-aza-5-methyluracil,
1-(2,5-dideoxy-5-iodo-4-methoxy-β-D-erythropentofuranosyl)-cytosine,
1-(2,5-dideoxy-5-iodo-4-methoxy-β-D-erythropentofuranosyl)-5-fluorocytosine,
1-(2,5-dideoxy-5-iodo-4-methoxy-β-D-erythropentofuranosyl)-5-butylcytosine, 1-(2,5-dideoxy-5-iodo-4-methoxy-β-D-erythropentofuranosyl)-5-trifluoromethylcytosine
1-(2,5-dideoxy-5-iodo-4-methoxy-β-D-erythropentofuranosyl)-5-nitrocytosine,
1-(2,5-dideoxy-5-iodo-4-methoxy-β-D-erythropentofuranosyl)-5-methylaminocytosine,
1-(2,5-dideoxy-5-iodo-4-methoxy-β-D-erythropentofuranosyl)-5-dimethylaminocytosine,
1-(2,5-dideoxy-5-iodo-4-methoxy-β-D-erythropentofuranosyl)-6-azacytosine, and
1-(2,5-dideoxy-5-iodo-4-methoxy-β-D-erythropentofuranosyl)-6-aza-5-methylcytosine,
and the corresponding
1-(2,5-dideoxy-5-iodo-4-methoxy-α-L-threopentofuranosyl)-pyrimidine nucleoside derivatives and also yields the corresponding β-D-arabino isomers, e.g.,
1-(5-deoxy-5-iodo-4-methoxy-β-D-arabinofuranosyl)-uracil,
1-(5-deoxy-5-iodo-4-methoxy-β-D-arabinofuranosyl)-5-fluorouracil,
1-(5-deoxy-5-iodo-4-methoxy-β-D-arabinofuranosyl)-5-butyluracil,
1-(5-deoxy-5-iodo-4-methoxy-β-D-arabinofuranosyl)-5-trifluroruracil,
1-(5-deoxy-5-iodo-4-methoxy-β-D-arabinofuranosyl)-5-nitrouracil,
1-(5-deoxy-5-iodo-4-methoxy-β-D-arabinofuranosyl)-5-methylaminouracil,
1-(5-deoxy-5-iodo-4-methoxy-β-D-arabinofuranosyl)-5-dimethylaminouracil,
1-(5-deoxy-5-iodo-4-methoxy-β-D-arabinofuranosyl)-6-azauracil,
1-(5-deoxy-5-iodo-4-methoxy-β-D-arabinofuranosyl)-6-aza-5-methyluracil,
1-(5-deoxy-5-iodo-4-methoxy-β-D-arabinofuranosyl)-cytosine,
1-(5-deoxy-5-iodo-4-methoxy-β-D-arabinofuranosyl)-5-fluorocytosine,
1-(5-deoxy-5-iodo-4-methoxy-β-D-arabinofuranosyl)-5-butylcytosine,
1-(5-deoxy-5-iodo-4-methoxy-β-D-arabinofuranosyl)-5-trifluoromethylcytosine,
1-(5-deoxy-5-iodo-4-methoxy-β-D-arabinofuranosyl)-5-nitrocytosine,
1-(5-deoxy-5-iodo-4-methoxy-β-D-arabinofuranosyl)-5-methylaminocytosine,
1-(5-deoxy-5-iodo-4-methoxy-β-D-arabinofuranosyl)-5-diemthylaminocytosine,
1-(5-deoxy-5-iodo-4-methoxy-β-D-arabinofuranosyl)-6-azacytosine,
1-(5-deoxy-5-iodo-4-methoxy-β-D-arabinofuranosyl)-6-aza-5-methylcytosine,
9-(5-deoxy-5-iodo-4-methoxy-β-D-arabinofuranosyl)-adenine,
9-(5-deoxy-5-iodo-4-methoxy-β-D-arabinofuranosyl)-2-fluoroadenine,
9-(5-deoxy-5-iodo-4-methoxy-β-D-arabinofuranosyl)-2-azaadenine,
9-(5-deoxy-5-iodo-4-methoxy-β-D-arabinofuranosyl)-7-deazaadenine,
9-(5-deoxy-5-iodo-4-methoxy-β-D-arabinofuranosyl)-8-azaadenine,
9-(5-deoxy-5-iodo-4-methoxy-β-D-arabinofuranosyl)-8-aza-9-deazaadenine,
9-(5-deoxy-5-iodo-4-methoxy-β-D-arabinofuranosyl)-7-deaza-7-cyanoadenine,
$N^6$-methyl-9-(5-deoxy-5-iodo-4-methoxy-β-D-arabinofuranosyl)-adenine,
$N^6$-methyl-9-(5-deoxy-5-iodo-4-methoxy-β-D-arabinofuranosyl)-adenine,
9-(5-deoxy-5-iodo-4-methoxy-β-D-arabinofuranosyl)-guanine,
9-(5-deoxy-5-iodo-4-methoxy-β-D-arabinofuranosyl)-8-azaguanine,
9-(5-deoxy-5-iodo-4-methoxy-62-D-arabinofuranosyl)-7-deazaguanine,
9-(5-deoxy-5-iodo-4-methoxy-β-D-arabinofuranosyl)-isoguanine,
9-(5-deoxy-5-iodo-4-methoxy-β-D-arabinofuranosyl)-hypoxanthine,
9-(5-deoxy-5-iodo-4-methoxy-β-D-arabinofuranosyl)-xanthine,
and the corresponding α-L-xylofuranosyl isomers.

Examples 28 through 33 relate to the preparation of the 4'-alkoxy and 4'-haloalkoxy nucleosides of Formula I.

EXAMPLE 28

$N^4,O^{2'},O^{3'}$ -tribenzoyl-5'-deoxy-5'-iodo-4'-methoxy-cytidine

5'-deoxy-5'-iodo-4'-methoxy-cytidine (1mmole) is dissolved in 20 ml. of dry pyridine and benzoyl chloride (15 mmole) is added. After 48 hours at 20°C. the excess reagent is destroyed by adding 0.5 ml. of water and the solvents are removed by evaporation under reduced pressure. The residue is then partitioned between chlorofrom and water and the chloroform layer is dried over magnesium sulfate, filtered and evaporated to dryness. The residue is purified by chromatography over silica gel and the major nucleoside fraction evaporated to dryness to yield $N^4, O^{2'}, O^{3'}$ -tribenzoyl-5'-deoxy-5'-iodo-4'-methoxy-cytidine as a dry foam.

EXAMPLE 29

Perbenzoylated
1-(5-deoxy-5-iodo-4-methoxy-β-D-ribofuranosyl) pyrimidines, and

Perbenzoylated
9-(5-deoxy-5-iodo-4-methoxy-β-D-ribofuranosyl) purines.

Repeating the procedure of Example 28 but replacing 5'-deoxy-5'-iodo-4'-methoxy-cytidine with the products of Examples 11 and 12 yields the corresponding:
$N^3,O^{2'},O^{3'}$ -tribenzoyl-5'-deoxy-5'-iodo-4'-methoxyuridine,
$N^3,O^{2'},O^{3'}$ -tribenzoyl-5'-deoxy-5'-iodo-4'-methoxy-5-fluorouridine,
$N^3,O^{2'},O^{3'}$ -tribenzoyl-5'-deoxy-5'-iodo-4'-methoxy-5-butyluridine,
$N^3,O^{2'},O^{3'}$ -tribenzoyl-5'-deoxy-5'-iodo4'-methoxy-5-trifluoromethyluridine,
$N^3,O^{2'},O^{3'}$ -tribenzoyl-5'-deoxy-5'-iodo-4'-methoxy-5-nitrouridine,
$N^3,O^{2'},O^{3'}$ -tribenzoyl-5'-deoxy-5'-iodo-4'-methoxy-5-methylaminouridine,
$N^3,O^{2'},O^{3'}$ -tribenzoyl-5'-deoxy-5'-iodo-4'-methoxy-5-dimethylaminouridine,
$N^3,O^{2'},O^{3'}$ -tribenzoyl-5'-deoxy-5'-iodo-4'-methoxy-6-azauridine, N³,O²',O³',-tribenzoyl-5'-deoxy-5'-iodo-4'-methoxy-6-aza-5-methyluridine,
N⁴,O²',O³'-tribenzoyl-5'-deoxy-5'-iodo-4'-methoxy-5-fluorocytidine,
N⁴,O²',O³'-tribenzoyl-5'-deoxy-5'-iodo-4'-methoxy-5-butylcytidine,
N⁴,O²',O³'-tribenzoyl-5'-deoxy-5'-iodo-4'-methoxy-5-trifluoromethylcytidine,
N⁴,O²',O³'-tribenzoyl-5'-deoxy-5'-iodo-4'-methoxy-5-nitrocytidine,
N⁴,O²',O³'-tribenzoyl-5'-deoxy-5'-iodo-4'-methoxy-5-methylaminocytidine,
N⁴,O²',O³'-tribenzoyl-5'-deoxy-5'-iodo-4'-methoxy-5-dimethylaminocytidine,
N⁴,O²',O³'-tribenzoyl-5'-deoxy-5'-iodo-4'-methoxy-6-azacytidine,
N⁴,O²',O³'-tribenzoyl-5'-deoxy-5'-iodo-4'-methoxy-6-aza-5-methylcytidine,
N¹,N⁶,O²',O³'-tetrabenzoyl-5'-deoxy-5'-iodo-4'-methoxy-adenosine,
N¹,N⁶,O²',O³'-tetrabenzoyl-5'-deoxy-5'-iodo,4'-methoxy-2-fluoroadenosine,
N¹,N⁶,O²',O³'-tetrabenzoyl-5'-deoxy-5'-iodo,4'-methoxy-2-azaadenosine,
N¹,N⁶,O²',O³'-tetrabenzoyl-5'-deoxy-5'-iodo-4'-methoxy-7-deazaadenosine,
N¹,N⁶,O²',O³'-tetrabenzoyl-5'-deoxy-5'-iodo-4'-methoxy-8-azaadenosine,
N¹,N⁶,O²',O³'-tetrabenzoyl-5'-deoxy-5'-iodo-4'-methoxy-7-deaza-7-cyanoadenosine,
N⁶,O²',O³'-tribenzoyl-N⁶-methyl-5'-deoxy-5'-iodo-4'-methoxy-adenosine,
O²',O³'-dibenzoyl-N⁶-dimethyl-5'-deoxy-5'-iodo-4'-methoxy-adenosine,
N²,O²',O³'-tribenzoyl-5'-deoxy-5'-iodo-4'-methoxyguanosine,
N²,O²',O³'-tribenzoyl-5'-deoxy-5'-iodo-4'-methoxy-8-azaguanosine,
N²,O²',O³'-tribenzoyl-5'-deoxy-5'-iodo-4'-methoxy-7-deazaguanosine,
N⁶,O²',O³'-tribenzoyl-5'-deoxy-5'-iodo-4'-methoxyisoguanosine,
2',3'-di-O-benzoyl-5'-deoxy-5'-iodo-4'-methoxyinosine, and
2',3'-di-O-benzoyl-5'-deoxy-5'-iodo-4'-methoxyxanthosine.

EXAMPLE 30

Perbenzoylated
1-(2,5-dideoxy-5-iodo-4-methoxy-β-D-erythropentofuranosyl) pyrimidines, Perbenzoylated
1-(5-deoxy-5-iodo-4-methoxy-β-D-arabinofuranosyl) pyrimidines, and Perbenzoylated
9-(5-deoxy-5-iodo-4-methoxy-β-D-arabinofuranosyl)purines Repeating the procedure of Example 28 but replacing 5'deoxy-5'-iodo-4'-methoxy-cytidine with
1-(2,5-dideoxy-5-iodo-4-methoxy-β-D-erythropentofuranosyl)-uracil,
1-(2,5-dideoxy-5-iodo-4-methoxy-β-D-erythropentofuranosyl)-5-fluorouracil,
1-(2,5-dideoxy-5-iodo-4-methoxy-β-D-erythropentofuranosyl)-5-butyluracil,
1-(2,5-dideoxy-5-iodo-4-methoxy-β-D-erythropentofuranosyl)-5-trifluoromethyluracil,
1-(2,5-dideoxy-5-iodo-4-methoxy-β-D-erythropentofuranosyl)-5-nitrouracil,
1-(2,5-dideoxy-5-iodo-4-methoxy-β-D-erythropentofuranosyl)-5-methylaminouracil,
1-(2,5-dideoxy-5-iodo-4-methoxy-β-D-erythropentofuranosyl)-5-dimethylaminouracil,
1-(2,5-dideoxy-5-iodo-4-methoxy-β-D-erythropentofuranosyl)-6-azauracil,
1-(2,5-dideoxy-5-iodo-4-methoxy-β-D-erythropentofuranosyl)-6-aza-5-methyluracil,
1-(2,5-dideoxy-5-iodo-4-methoxy-β-D-erythropentofuranosyl)-cytosine,
1-(2,5-dideoxy-5-iodo-4-methoxy-β-D-erythropentofuranosyl)-5-fluorocytosine,
1-(2,5-dideoxy-5-iodo-4-methoxy-β-D-erythropentofuranosyl)-5-butylcytosine,
1-(2,5-dideoxy-5-iodo-4-methoxy-β-D-erythropentofuranosyl)-5-trifluoromethylcytosine,
1-(2,5-dideoxy-5-iodo-4-methoxy-β-D-erythropentofuranosyl)-5-nitrocytosine,
1-(2,5-dideoxy-5-iodo-4-methoxy-β-D-erythropentofuranosyl)-5-methylaminocytosine,
1-(2,5-dideoxy-5-iodo-4-methoxy-β-D-erythropentofuranosyl)-5-dimethylaminocytosine,
1-(2,5-dideoxy-5-iodo-4-methoxy-β-D-erythropentofuranosyl)-6-azacytosine,
1-(2,5-dideoxy-5-iodo-4-methoxy-β-D-erythropentofuranosyl)-6-aza-5-methylcytosine,
1-(5-deoxy-5-iodo-4-methoxy-β-D-arabinofuranosyl)-uracil,
1-(5-deoxy-5-iodo-4-methoxy-β-D-arabinofuranosyl)-5-fluorouracil,
1-(5-deoxy-5-iodo-4-methoxy-β-D-arabinofuranosyl)-5-butyluracil,
1-(5-deoxy-5-iodo-4-methoxy-β-D-arabinofuranosyl)-5-trifluoromethyluracil,
1-(5-deoxy-5-iodo-4-methoxy-β-D-arabinofuranosyl)-5-nitrouracil,
1-(5-deoxy-5-iodo-4-methoxy-β-D-arabinofuranosyl)-5-methylaminouracil,
1-(5-deoxy-5-iodo-4-methoxy-β-D-arabinofuranosyl)-5-dimethylaminouracil,
1-(5-deoxy-5-iodo-4-methoxy-β-D-arabinofuranosyl)-6-azauracil,
1-(5-deoxy-5-iodo-4-methoxy-β-D-arabinofuranosyl)-6-aza-5-methyluracil,
1-(5-deoxy-5-iodo-4-methoxy-β-D-arabinofuranosyl)-cytosine,
1-(5-deoxy-5-iodo-4-methoxy-β-D-arabinofuranosyl)-5-fluorocytosine,
1-(5-deoxy-5-iodo-4-methoxy-β-D-arabinofuranosyl)-5-butylcytosine,
1-(5-deoxy-5-iodo-4-methoxy-β-D-arabinofuranosyl)-5-trifluoromethylcytosine,
1-(5-deoxy-5-iodo-4-methoxy-β-D-arabinofuranosyl)-5-nitrocytosine,
1-(5-deoxy-5-iodo-4-methoxy-β-D-arabinofuranosyl)-5-methylaminocytosine,
1-(5-deoxy-5-iodo-4-methoxy-β-D-arabinofuranosyl)-5-dimethylaminocytosine,
1-(5-deoxy-5-iodo-4-methoxy-β-D-arabinofuranosyl)-6-azacytosine,
1-(5-deoxy-5-iodo-4-methoxy-β-D-arabinofuranosyl)-6-aza-5-methylcytosine, 9-(5-deoxy-5-iodo-4-methoxy-β-D-arabinofuranosyl)-adenine,
9-(5-deoxy-5-iodo-4-methoxy-β-D-arabinofuranosyl)-2-fluoroadenine,
9-(5-deoxy-5-iodo-4-methoxy-β-D-arabinofuranosyl)-2-azaadenine,
9-(5-deoxy-5-iodo-4-methoxy-β-D-arabinofuranosyl)-7-deazaadenine,
9-(5-deoxy-5-iodo-4-methoxy-β-D-arabinofuranosyl)-8-azaadenine,
9-(5-deoxy-5-iodo-4-methoxy-β-D-arabinofuranosyl)-7-deaza-7-cyanoadenine,
$N^6$-methyl-9-(5-deoxy-5-iodo-4-methoxy-β-D-arabinofuranosyl)-adenine,
$N^6$-dimethyl-9-(5-deoxy-5-iodo-4-methoxy-β-D-arabinofuranosyl)-adenine,
9-(5-deoxy-5-iodo-4-methoxy-β-D-arabinofuranosyl)-guanine,
9-(5-deoxy-5-iodo-4-methoxy-β-D-arabinofuranosyl)-8-azaguanine,
9-(5-deoxy-5-iodo-4-methoxy-β-D-arabinofuranosyl)-7-deazaguanine,
9-(5-deoxy-5-iodo-4-methoxy-β2-D-arabinofuranosyl)-isoguanine,
9-(5-deoxy-5-iodo-4-methoxy-β-D-arabinofuranosyl)-hypoxanthine, and
9-(5-deoxy-5-iodo-4-methoxy-β-D-arabinofuranosyl)-xanthine;

yields the corresponding $N^3$-benzoyl-1-(3-O-benzoyl-2,5-dideoxy-5-iodo-4-methoxy-β-D-erythro-pentofuranosyl)-uracil,
$N^3$-benzoyl-1-(3-O-benzoyl-2,5-dideoxy-5-iodo-4-methoxy-β-D-erythro-pentofuranosyl)-5-flourouracil,
$N^3$-benzoyl-1-(3-O-benzoyl-2,5-dideoxy-5-iodo-4-methoxy-β-D-erythro-pentofuranosyl)-5-butyluracil,
$N^3$-benzoyl-1-(3-O-benzoyl-2,5-dideoxy-5-iodo-4-methoxy-β-D-erythro-pentofuranosyl)-5-trifluoromethyluracil,
$N^3$-benzoyl-1-(3-O-benzoyl-2,5-dideoxy-5-iodo-4-methoxy-β-D-erythro-pentofuranosyl)-5-nitrouracil,
$N^3$-benzoyl-1-(3-O-benzoyl-2,5-dideoxy-5-iodo-4-methoxy-β-D-erythro-pentofuranosyl)-5-methylaminouracil,
$N^3$-benzoyl-1-(3-O-benzoyl-2,5-dideoxy-5iodo-4-methoxy-β-D-erythro-pentofuranosyl)-5-dimethylaminouracil,
$N^3$-benzoyl-1-(3-O-benzoyl-2,5-dideoxy-5-iodo-4-methoxy-β-D-erythro-pentofuranosyl)-6-azauracil,
$N^3$-benzoyl-1-(3-O-benzoyl-2,5-dideoxy-5-iodo-4-methoxy-β-D-erythro-pentofuranosyl)-6-aza-5-methyluracil,
$N^4$-benzoyl-1-(3-O-benzoyl-2,5-dideoxy-5-iodo-4-methoxy-β-D-erythro-pentofuranosyl)-cytosine,
$N^4$-benzoyl-1-(3-O-benzoyl-2,5-dideoxy-5-iodo-4-methoxy-β-D-erythro-pentofuranosyl)-5-fluorocytosine,
$N^4$-benzoyl-1-(3-O-benzoyl-2,5-dideoxy-5-iodo-4-methoxy-β-D-erythro-pentofuranosyl)-5-butylcytosine,
$N^4$benzoyl-1-(3-O-benzoyl-2,5-dideoxy-5-iodo-4-methoxy-β-D-erythro-pentofuranosyl)-5-trifluoromethylcytosine,
$N^4$-benzoyl-1-(3-O-benzoyl-2,5-dideoxy-5-iodo-4-methoxy-β-D-erythro-pentofuranosyl)-5-nitrocytosine,
$N^4$-benzoyl-1-(3-O-benzoyl-2,5-dideoxy-5-iodo-4-methoxy-β-D-erythro-pentofuranosyl)-5-methylaminocytosine. '$N^4$-benzoyl-1-(3-O-benzoyl-2,5-dideoxy-5-iodo-4-methoxy-β-D-erythro-pentofuranosyl)-5-methylaminocytosine,
$N^4$-benzoyl-1-(3-O-benzoyl-2,5-dideoxy-5-iodo-4-methoxy-β-D-erythro-pentofuranosyl)-5-dimethylaminocytosine,
$N^4$-benzoyl-1-(3-O-benzoyl-2,5-dideoxy-5-iodo-4-methoxy-β-D-erythro-pentofuranosyl)-6-azacytosine,
$N^4$-benzoyl-1-(3-O-benzoyl-2,5-dideoxy-5-iodo-4-methoxy-β-D-erythro-pentofuranosyl)-6-aza-5-methylcytosine,
$N^3$-benzoyl-1-(2,3-di-O-benzoyl-5-deoxy-5-iodo-4-methoxy-β-D-arabinofuranosyl)-uracil,
$N^3$-benzoyl-1-(2,3-di-O-benzoyl-5-deoxy-5-iodo-4-methoxy-β-D-arabinofuranosyl)-5-fluorouracil,
$N^3$-benzoyl-1-(2,3-di-O-benzoyl-5-deoxy-5-iodo-4-methoxy-β-D-arabinofuranosyl)-5-butyluracil,
$N^3$-benzoyl-1-(2,3-di-O-benzoyl-5-deoxy-5-iodo-4-methoxy-β-D-arabinofuranosyl)-5-trifluoromethyluracil,
$N^3$-benzoyl-1-(2,3-di-O-benzoyl-5-deoxy-5-iodo-4-methoxy-β-D-arabinofuranosyl)-5-nitrouracil,
$N^3$-benzoyl-1-(2,3-di-O-benzoyl-5-deoxy-5-iodo-4-methoxy-β-D-arabinofuranosyl)-5-methylaminouracil,
$N^3$-benzoyl-1-(2,3-di-O-benzoyl-5-deoxy-5-iodo-4-methoxy-β-D-arabinofuranosyl)-5-dimethylaminouracil,
$N^3$-benzoyl-1-(2,3-di-O-benzoyl-5-deoxy-5-iodo-4-methoxy-β-D-arabinofuranosyl)-6-azauracil,
$N^3$-benzoyl-1-(2,3-di-O-benzoyl-5-deoxy-5-iodo-4-methoxy-β-D-arabinofuranosyl)-6-aza-5-methyluracil,
$N^4$-benzoyl-1-(2,3-di-O-benzoyl-5-deoxy-5-iodo-4-methoxy-β-D-arabinofuranosyl)-cytosine,
$N^4$-benzoyl-1-(2,3-di-O-benzoyl-5-deoxy-5-iodo-4-methoxy-β-D-arabinofuranosyl)-5-fluorocytosine,
$N^4$-benzoyl-1-(2,3-di-O-benzoyl-5-deoxy-5-iodo-4-methoxy-β-D-arabinofuranosyl)-5-butylcytosine,
$N^4$-benzoyl-1-(2,3,-di-O-benzoyl-5-deoxy-5-iodo-4-methoxy-β-D-arabinofuranosyl)-5-trifluoromethylcytosine,
$N^4$-benzoyl-1-(2,3-di-O-benzoyl-5-deoxy-5-iodo-4-methoxy-β-D-arabinofuranosyl)-5-nitrocytosine,
$N^4$-benzoyl-1-(2,3-di-O-benzoyl-5-deoxy-5-iodo-4-methoxy-β-D-arabinofuranosyl)-5-methylaminocytosine,
$N^4$-benzoyl-1-(2,3-di-O-benzoyl-5-deoxy-5-iodo-4-methoxy-β-D-arabinofuranosyl)-5-dimethylaminocytosine,
$N^4$-benzoyl-1-(2,3-di-O-benzoyl-5-deoxy-5-iodo-4-methoxy-β-D-arabinofuranosyl)-6-azacytosine,
$N^4$-benzoyl-1-(2,3-di-O-benzoyl-5-deoxy-5-iodo-4-methoxy-β-D-arabinofuranosyl)-6-aza-5-methylcytosine,
$N^1$, $N^6$-dibenzoyl-9-(2,3-di-O-benzoyl-5-deoxy-5-iodo-4-methoxy-β-D-arabinofuranosyl)-adenine,
$N^1$, $N^6$-dibenzoyl-9-(2,3-di-O-benzoyl-5-deoxy-5-iodo-4-methoxy-β-D-arabinofuranosyl)-2-fluoroadenine, N$^1$, N$^6$-dibenzoyl-9-(2,3-di-O-benzoyl-5-dexoy-5-o-4-methoxy-β-D-arabinofuranosyl)-2-azaadenine, N$^1$, N$^6$, dibenzoyl-9-(2,3-di-O-benzoyl-5-deoxy-5--4-methoxy-β-D-arabinofuranosyl)-7-deazaadenine, N$^1$,N$^6$, dibenzoyl-9-(2,3-di-O-benzoyl-5-deoxy-5--4-methoxy-β-D-arabinofuranosyl)-8-deazaadenine, N$^1$,N$^6$, dibenzoyl-9-(2,3-di-O-benzoyl-5-deoxy-5--4-methoxy-β-D-arabinofuranosyl)-8-aza-9-deazaadenine, N$^1$,N$^6$-dibenzoyl-9-(2,3-di-O-benzoyl-5-deoxy-5--4-methoxy-β-D-arabinofuranosyl)-7-deaza-7-cyanoadenine, N$^6$-benzoyl-N$^6$-methyl-9-(2,3-di-O-benzoyl-5-deoxy-5-iodo-4-methoxy-β-D-arabinofuranosyl)-adenine, N$^6$-dimethyl-9-(2,3-di-O-benzoyl-5-deoxy-5-iodo-4-methoxy-β-D-arabinofuranosyl)-adenine, N$^2$-benzoyl-9-(2,3-di-O-benzoyl-5-deoxy-5-iodo-4-methoxy-β-D-arabinofuranosyl)-guanine, N$^2$-benzoyl-9-(2,3-di-O-benzoyl-5-deoxy-5-iodo-4-methoxy-β-D-arabinofuranosyl)-8-azaguanine, N$^2$-benzoyl-9-(2,3-di-O-benzoyl-5-deoxy-5-iodo-4-methoxy-β-D-arabinofuranosyl)-7-deazaguanine, N$^6$-benzoyl-9-(2,3-di-O-benzoyl-5-deoxy-5-iodo-4-methoxy-β-D-arabinofuranosyl)-isoguanine, 9-(2,3-di-O-benzoyl-5-deoxy-5-iodo-4-methoxy-β-D-arabinofuranosyl)-hypoxanthine, and 9-(2,3-di-O-benzoyl-5-deoxy-5-iodo-4-methoxy-β-D-arabinofuranosyl)-xanthine.

EXAMPLE 31

N$^4$-benzoyl-1-(2,3,5-tri-Obenzoyl-4-methoxy-β-D-arabinofuranosyl)-cytosine

N$^4$-benzoyl-1-(2,3-di-O-benzoyl-5-deoxy-5-iodo-4-methoxy-β-D-arabinofuranosyl)-cytosine (1 mmole) is dissolved in 20 ml. of hexamethylphosphorotriamide and lithium benzoate (6 mmole) is added. After 24 hours at 105°C the solvent is evaporated at 90°–100°C. under vacuum and the residue is taken up in 30 ml. of ethyl acetate. The insoluble precipitate is removed by filtration, the filtrate is evaporated to dryness and the residue purified by preparative thin layer chromatography over silica gel. The main UV band is eluted from the silica gel with methanol. Evaporation of the solvent yields N$^4$ benzoyl-1-(2,3,4-tri-O-benzoyl-4-methoxy-β-D-arabinofuranosyl)-cytosine.

EXAMPLE 32

1-(4-methoxy-β-D-arabinofuranosyl)-cytosine

The N$^4$benzoyl-1-(2,3,5-tri-O-benzoyl-4-methoxy-β-D-arabinofuranosyl)-cytosine prepared in Example 31 is dissolved in 20 ml. of a mixture of methanol and concentrated ammounium hydroxide (1:1). The hydrolysis is pursued for 20 hours at 40°C. The reaction mixture is then evaporated to dryness and the residue purified by preparative thin layer chromatography over silica gel. Each UV band is eluted from the silica gel with methanol, evaporated to dryness and analyzed by UV and NMR. The band corresponding to 1-(4-methoxy-β-D-arabinofuranosyl)-cytosine is then further purified over silica gel to give the analytically pure nucleoside.

EXAMPLE 33

1-(4-methoxy-β-D-ribofuranosyl) pyrimidines, 9-(4-methoxy-β-D-ribofuranosyl) purines, 1-(2-deoxy-4-methoxy-β-D-erythro-pentofuranosyl) pyrimidines, 1-(4-methoxy-β-D-arabinofuranosyl)pyrimidines, and 9-(4-methoxy-β-D-arabinofuranosyl)purines Repeating the procedures of Examples 31 and 32 but replacing N$^4$-benzoyl-1-(2,3-di-O-benzoyl-5-deoxy-5-iodo-4-methoxy-β-D-arabinofuranosyl)-cytosine in Example 31 with N$^3$,O$^{2'}$,O$^{3'}$-tribenzoyl-5'-deoxy-5'-iodo-4'-methoxyuridine, N$^3$, O$^{2'}$,O$^{3'}$-tribenzoyl-5'-deoxy-5'-iodo-4'-methoxy-5-fluorouridine, N$^3$,O$^{2'}$,O$^{3'}$-tribenzoyl-5'-deoxy-5'-iodo-4'-methoxy-5-butyluridine, N$^3$,O$^{2'}$,O$^{3'}$-tribenzoyl-5'-deoxy-5'-iodo-4'-methoxy-5-trifluoromethyluridine, N$^3$,O$^{2'}$,O$^{3'}$-tribenzoyl-5'-deoxy-5'-iodo-4'-methoxy-5-nitrouridine, N$^3$,O$^{2'}$,O$^{3'}$-tribenzoyl-5'-deoxy-5'-iodo-4'-methoxy-5-methylaminouridine, N$^3$,O$^{2'}$,O$^{3'}$-tribenzoyl-5'-deoxy-5'-iodo-4'-methoxy-5-dimethylaminouridine, N$^3$,O$^{2'}$,O$^{3'}$-tribenzoyl-5'-deoxy-5'-iodo-4'-methoxy-6-azauridine, N$^3$,O$^{2'}$,O$^{3'}$-tribenzoyl-5'-deoxy-5'-iodo-4'-methoxy-6-aza-5-methyluridine, N$^4$,O$^{2'}$,O$^{3'}$-tribenzoyl-5'-deoxy-5'-iodo-4'-methoxy-cytidine, N$^4$,O$^{2'}$,O$^{3'}$-tribenzoyl-5'-deoxy-5'-iodo-4'-methoxy-5-fluorocytidine, N$^4$,O$^{2'}$,O$^{3'}$-tribenzoyl-5'-deoxy-5'-iodo-4'-methoxy-5-butylcytidine, N$^4$,O$^{2'}$,O$^{3'}$-tribenzoyl-5'-deoxy-5'-iodo-5'-methoxy-5-trifluoromethylcytidine, N$^4$,O$^{2'}$,O$^{3'}$-tribenzoyl-5'-deoxy-5'iodo-4'-methoxy-5-nitrocytidine, N$^4$,O$^{2'}$,O$^{3'}$-tribenzoyl-5'-deoxy-5'-iodo-4'-methoxy-5-methylaminocytidine, N$^4$,O$^{2'}$,O$^{3'}$-tribenzoyl-5'-deoxy-5'-iodo-4'-methoxy-5-dimethylaminocytidine, N$^4$,O$^{2'}$,O$^{3'}$-tribenzoyl-5'-deoxy-5'-iodo-4'-methoxy-6-azacytidine, N$^4$,O$^{2'}$,O$^{3'}$-tribenzoyl-5'-deoxy-5'-iodo-4'-methoxy-6-aza-5-methylcytidine, N$^1$,N$^6$,O$^{2'}$,O$^{3'}$-tetrabenzoyl-5'-deoxy-5'-iodo-4'-methoxy-adenosine, $N^1,N^6,O^{2'},O^{3'}$-tetrabenzoyl-5'-deoxy-5'-iodo-4'-methoxy-2-fluoroadenosine, $N^1, N^6,O^{2'},O^{3'}$-tetrabenzoyl-5'-deoxy-5'-iodo-4'-methoxy-2-azaadenosine, $N^1,N^6,O^2,O^3$-tetrabenzoyl-5'-deoxy-5'-iodo-4'-methoxy-7-deazaadenosine, $N^1,N^6,O^{2'},O^{3'}$-tetrabenzoyl-5'-deoxy-5'-iodo-4'-methoxy-8-azaadenosine, $N^1, N^6,O^{2'},O^{3'}$-tetrabenzoyl-5'-deoxy-5'-iodo-4'-methoxy-8-aza-9-deazaadenosine, $N^1,N^6,O^{2'},O^{3'}$-tetrabenzoyl-5'-deoxy-5'-iodo-4'-methoxy-7-deaza-7-cyanoadenosine, $N^6,O^{2'},O^{3'}$-tribenzoyl-$N^6$-methyl-5'-deoxy-5'-iodo-4'-methoxy-adenosine, $O^{2'},O^{3'}$-dibenzoyl-$N^6$-dimethyl-5'-deoxy-5'-iodo-4'-methoxy-adenosine, $N^2,O^{2'},O^{3'}$-tribenzoyl-5'-deoxy-5'-iodo-4'-methoxyguanosine, $N^2, O^{2'},O^{3'}$-tribenzoyl-5'-deoxy-5'-iodo-4'-methoxy-8-azaguanosine, $N^2, O^{2'},O^3$-tribenzoyl-5'-deoxy-5'-iodo-4'-methoxy-7-deazaguanosine, $N^6, O^{2'},O^{3'}$-tribenzoyl-5'-deoxy-5'-iodo-4'-methoxy-isoguanosine, 2',3'-di-O-benzoyl-5'-iodo-4'-methoxy-inosine, 2',3'-di-O-benzoyl-5'-iodo-4'-methoxy-xanthosine, $N^3$-benzoyl-1-(3-O-benzoyl-2,5-dideoxy-5-iodo-4-methoxy-β-D-erythro-pentofuranosyl)uracil, $N^3$-benzoyl-1-(3-O-benzoyl-2,5-dideoxy-5-iodo-4-methoxy-β-D-erythro-pentofuranosyl)-5-fluorouracil, $N^3$-benzoyl-1-(3-O-benzoyl-2,5-dideoxy-5-iodo-4-methoxy-β-D-erythro-pentofuranosyl)-5-butyluracil, $N^3$-benzoyl-1-(3-O-benzoyl-2,5-dideoxy-5-iodo-4-methoxy-β-D-erythro-pentofuranosyl)-5-trifluoromethyluracil, $N^3$-benzoyl-1-(3-O-benzoyl-2,5-dideoxy-5-iodo-4-methoxy-β-D-erythro-pentofuranosyl)-5-nitrouracil, $N^3$-benzoyl-1-(3-O-benzoyl-2,5-dideoxy-5-iodo-4-methoxy-β-D-erythro-pentofuranosyl)-5-methylaminouracil, $N^3$-benzoyl-1-(3-O-benzoyl-2,5-dideoxy-5-iodo-4-methoxy-β-D-erythro-pentofuranosyl)-5-dimethylaminouracil, $N^3$-benzoyl-1-(3-O-benzoyl-2,5-dideoxy-5-iodo-4-methoxy-β-D-erythro-pentofuranosyl)-6-azauracil, $N^3$-benzoyl-1-(3-O-benzoyl-2,5-dideoxy-5-iodo-4-methoxy-β-D-erythro-pentofuranosyl)-6-aza5-methyluracil, $N^4$-benzoyl-1-(3-O-benzoyl-2,5-dideoxy-5-iodo-4-methoxy-β-D-erythro-pentofuranosyl)cytosine, $N^4$-benzoyl-1-(3-O-benzoyl-2,5-dideoxy-5-iodo-4-methoxy-β-D-erythro-pentofuranosyl)-5-fluoracytosine, $N^4$-benzoyl-1-(3-O-benzoyl-2,5-dideoxy-5-iodo-4-methoxy-β-D-erythro-pentofuranosyl)-5-butylcytosine, $N^4$-benzoyl-1-(3-O-benzoyl-2,5-didexoy-5-iodo-4-methoxy-β-D-erythro-pentofuranosyl)-5-trifluoromethylcytosine, $N^4$-benzoyl-1-(3-O-benzoyl-2,5-dideoxy-5-iodo-4-methoxy-β-D-erythro-pentofuranosyl)-5-nitrocytosine, $N^4$-benzoyl-1-(3-O-benzoyl-2,5-dideoxy-5-iodo-4-methoxy-β-D-erythro-pentofuranosyl)-5-methylaminocytosine, $N^4$-benzoyl-1-(3-O-benzoyl-2,5-dideoxy-5-iodo-4-methoxy-β-D-erythro-pentofuranosyl)-5-dimethylaminocytosine, $N^4$-benzoyl-1-(3-O-benzoyl-2,5-dideoxy-5-iodo-4-methoxy-β-D-erythro-pentofuranosyl)-6-azacytosine.

$N^4$-benzoyl-1-(3-O-benzoyl-2,5-dideoxy-5-iodo-4-methoxy-β-D-erythro-pentofuranosyl)-6-aza-5-methylcytosine, $N^3$-benzoyl-1-(2,3-di-O-benzoyl-5-deoxy-5-iodo-4-methoxy-β-D-arabinofuranosyl)uracil, $N^3$-benzoyl-1-(2,3-di-O-benzoyl-5-deoxy-5-iodo-4-methoxy-β-D-arabinofuranosyl)-5-fluorouracil, $N^3$-benzoyl-1-(2,3-di-O-benzoyl-5-deoxy-5-iodo-4-methoxy-β-D-arabinofuranosyl)-5-butyluracil, $N^3$-benzoyl-1-(2,3-di-O-benzoyl-5-deoxy-5-iodo-4-methoxy-β-D-arabinofuranosyl)-5-trifluoromethyluracil, $N^3$-benzoyl-1-(2,3-di-O-benzoyl-5-deoxy-5-iodo-4-methoxy-β-D-arabinofuranosyl)-5-nitrouracil, $N^3$-benzoyl-1-(2,3-di-O-benzoyl-5-deoxy-5-iodo-4-methoxy-β-D-arabionfuranosyl)-5-methylaminouracil, $N^3$-benzoyl-1-(2,3-di-O-benzoyl-5-deoxy-5-iodo-4-methoxy-β-D-arabinofuranosyl)-5-dimethylaminouracil, $N^3$-benzoyl-1-(2,3-di-O-benzoyl-5-deoxy-5-iodo-4-methoxy-β-D-arabinofuranosyl)-6-azauracil, $N^3$-benzoyl-1-(2,3-di-O-benzoyl-5-deoxy-5-iodo-4-methoxy-β-D-arabinofuranosyl)-6-aza-5-methyluracil, $N^4$-benzoyl-1-(2,3-di-O-benzoyl-5-deoxy-5-iodo-4-methoxy-β-D-arabinofuranosyl)-5-fluorocytosine, $N^4$-benzoyl-1-(2,3-di-O-benzoyl-5-deoxy-5-iodo-4-methoxy-β-D-arabinofuranosyl)-5-butylcytosine, $N^4$-benzoyl-1-(2,3-di-O-benzoyl-5-deoxy-5-iodo-4-methoxy-β-D-arabinofuranosyl)-5-trifluoromethylcytosine.

$N^4$-benzoyl-1-(2,3-di-O-benzoyl-5-deoxy-5-iodo-4-methoxy-β-D-arabinofuranosyl)-5-nitrocytosine, $N^4$-benzoyl-1-(2,3-di-O-benzoyl-5-deoxy-5-iodo-4-methoxy-β-D-arabinofuranosyl)-5-methylaminocytosine.

$N^4$-benzoyl-1-(2,3-di-O-benzoyl-5-deoxy-5-iodo-4-methoxy-β-D-arabinofuranosyl)-5-dimethylaminocytosine, $N^4$-benzoyl-1-(2,3-di-O-benzoyl-5-deoxy-5-5-iodo-4-methoxy-β-D-arabinofuranosyl)-6-azacytosine, $N^4$-benzoyl-1-(2,3-di-O-benzoyl-5-deoxy-5-iodo-4-methoxy-β-D-arabinofuranosyl)-6-aza-5-methylcytosine, $N^1,N^6$-dibenzoyl-9-(2,3-di-O-benzoyl-5-deoxy-5-iodo-4-methoxy-β-D-arabinofuranosyl)adenine, $N^1, N^6$-dibenzoyl-9-(2,3-di-O-benzoyl-5-deoxy-5-iodo-4-methoxy-β-D-arabinofuranosyl)-2-fluoroadenine, $N^1,N^6$-dibenzoyl-9-(2,3-di-O-benzoyl-5-deoxy-5-iodo-4-methoxy-β-D-arabinofuranosyl)-2-azaadenine, $N^1, N^6$-dibenzoyl-9-(2,3-di-O-benzoyl-5-deoxy-5-iodo-4-methoxy-β-D-arabinofuranosyl)-7-deazaadenine, N¹, N⁶-dibenzoyl-9-(2,3-di-O-benzoyl-5-deoxy-5-iodo-4-methoxy-β-D-arabinofuranosyl)-8-azaadenine,
N¹,N⁶-dibenzoyl-9-(2,3-di-O-benzoyl-5-deoxy-5-iodo-4-methoxy-β-D-arabinofuranosyl)-8-aza-9-deazaadenine,
N¹,N⁶-dibenzoyl-9-(2,3-di-O-benzoyl-5-deoxy-5-iodo-4-methoxy-β-D-arabinofuranosyl)-7-deaza-7-cyanoadenine,
N⁶-benzoyl-N⁶-methyl-9-(2,3-di-O-benzoyl-5-deoxy-5-iodo-4-methoxy-β-D-arabinofuranosyl)-adenine,
N⁶-dimethyl-9-(2,3-di-O-benzoyl-5-deoxy-5-iodo-4-methoxy-β-D-arabinofuranosyl)-adenine,
N²-benzoyl-9-(2,3-di-O-benzoyl-5-deoxy-5-iodo-4-methoxy-β-D-arabinofuranosyl)-guanine,
N²-benzoyl-9-(2,3-di-O-benzoyl-5-deoxy-5-iodo-4-methoxy-β-D-arabinofuranosyl)-8-azaguanine,
N²-benzoyl-9-(2,3-di-O-benzoyl-5-deoxy-5-iodo-4-methoxy-β-D-arabinofuranosyl)-7-deazaguanine,
N⁶-benzoyl-9-(2,3-di-O-benzoyl-5-deoxy-5-iodo-4-methoxy-β-D-arabinofuranosyl)-isoguanine,
9-(2,3-di-O-benzoyl-5-deoxy-5-iodo-4-methoxy-β-D-arabinofuranosyl)-hypoxanthine, and
9-(2,3-di-O-benzoyl-5-deoxy-5-iodo-4-methoxy-β-D-arabinofuranosyl)-xanthine
yields the corresponding
4'-methoxy-uridine,
4'-methoxy-5-fluorouridine,
4'-methoxy-5-butyluridine,
4'-methoxy-5-trifluoromethyluridine,
4'-methoxy-5-nitrouridine,
4'-methoxy-5-methylaminouridine,
4'-methoxy-5-dimethylaminouridine,
4'-methoxy-6-azauridine,
4'-methoxy-6-aza-5-methyluridine,
4'-methoxy-cytidine,
4'-methoxy-5-fluorocytidine,
4'-methoxy-5-butylcytidine,
4'-methoxy-5-trifluoromethylcytidine,
4'-methoxy-5-nitrocytidine,
4'-methoxy-5-methylaminocytidine,
4'-methoxy-5-dimethylaminocytidine,
4'-methoxy-6-azacytidine,
4'-methoxy-6-aza-5-methylcytidine,
4'-methoxy-adenosine,
4'-methoxy-2-fluoroadenosine,
4'-methoxy-2-azaadenosine,
4'-methoxy-7-deazaadenosine,
4'-methoxy-8-azaadenosine,
4'-methoxy-8-aza-9-deazaadenosine,
4'-methoxy-7-deaza-7-cyanoadenosine,
N⁶-methyl-4'-methoxy-adenosine,
N⁶-dimethyl-4'-methoxy-adenosine,
4'-methoxy-guanosine,
4'-methoxy-8-azaguanosine,
4'-methoxy-7-deazaguanosine,
4'-methoxy-isoguanosine,
4'-methoxy-inosine,
4'-methoxy-xanthosine,
1-(2-deoxy-4-methoxy-β-D-erythro-pentofuranosyl)-uracil,
1-(2-deoxy-4-methoxy-β-D-erythro-pentofuranosyl)-5-fluorouracil,
1-(2-deoxy-4-methoxy-β-D-erythro-pentofuranosyl)-5-butyluracil,
1-(2-deoxy-4-methoxy-β-D-erythro-pentofuranosyl)-5-trifluoromethyluracil,
1-(2-deoxy-4-methoxy-β-D-erythro-pentofuranosyl)-uracil,
1-(2-deoxy-4-methoxy-β-D-erythro-pentofuranosyl)-5-nitrouracil,
1-(2-deoxy-4-methoxy-β-D-erythro-pentofuranosyl)-5-methylaminouracil,
1-(2-deoxy-4-methoxy-β-D-erythro-pentofuranosyl)-5-dimethylaminouracil,
1-(2-deoxy-4-methoxy-β-D-erythro-pentofuranosyl)-6-azauracil,
1-(2-deoxy-4-methoxy-β-D-erythro-pentofuranosyl)-6-aza-5-methyluracil,
1-(2-deoxy-4-methoxy-β-D-erythro-pentofuranosyl)-cytosine,
1-(2-deoxy-4-methoxy-β-D-erythro-pentofuranosyl)-5-fluorocytosine,
1-(2-deoxy-4-methoxy-β-D-erythro-pentofuranosyl)-5-butylcytosine,
1-(2-deoxy-4-methoxy-β-D-erythro-pentofuranosyl)-5-trifluoromethylcytosine,
1-(2-deoxy-4-methoxy-β-D-erythro-pentofuranosyl)-5-nitrocytosine,
1-(2-deoxy-4-methoxy-β-D-erythro-pentofuranosyl)-5-methylaminocytosine,
1-(2-deoxy-4-methoxy-β-D-erythro-pentofuranosyl)-5-dimethylaminocytosine,
1-(2-deoxy-4-methoxy-β-D-erythro-pentofuranosyl)-6-azacytosine,
1-(2-deoxy-4-methoxy-β-D-erythro-pentofuranosyl)-6-aza-5-methylcytosine,
1-(4-methoxy-β-D-arabinofuranosyl)-uracil,
1-(4-methoxy-β-D-arabinofuranosyl)-5-butyluracil,
1-(4-methoxy-β-D-arabinofuranosyl)-5-trifluoromethyluracil,
1-(4-methoxy-β-D-arabinofuranosyl)-5-fluorouracil,
1-(4-methoxy-β-D-arabinofuranosyl)-5-nitrouracil,
1-(4-methoxy-β-D-arabinofuranosyl)-5-methylaminouracil,
1-(4-methoxy-β-D-arabinofuranosyl)-5-dimethylaminouracil,
1-(4-methoxy-β-D-arabinofuranosyl)-6-azauracil,
1-(4-methoxy-β-D-arabinofuranosyl)-6-aza-5-methyluracil,
1-(4-methoxy-β-D-arabinofuranosyl)-cytosine,
1-(4-methoxy-β-D-arabinofuranosyl)-5-fluorocytosine,
1-(4-methoxy-β-D-arabinofuranosyl)-5-butylcytosine,
1-(4-methoxy-β-D-arabinofuranosyl)-5-trifluoromethylcytosine,
1-(4-methoxy-β-D-arabinofuranosyl)-5-nitrocytsoine,
1-(4-methoxy-β-D-arabinofuranosyl)-5-methylaminocytosine,
1-(4-methoxy-β-D-arabinofuranosyl)-5-dimethylaminouracil,
1-(4-methoxy-β-D-arabinofuranosyl)-6-azacytosine,
1-(4-methoxy-β-D-arabinofuranosyl)-6-aza-5-methylcytosine,
9-(4-methoxy-β-D-arabinofuranosyl)-adenine,
9-(4-methoxy-β-D-arabinofuranosyl)-2-fluoroadenine,
9-(4-methoxy-β-D-arabinofuranosyl)-2-azaadenine,
9-(4-methoxy-β-D-arabinofuranosyl)-7-deazaadenine,
9-(4-methoxy-β-D-arabinofuranosyl)-8-azaadenine, 9-(4-methoxy-β-D-arabinofuranosyl)-8-aza-9-deazaadenine, 9-(4-methoxy-β-D-arabinofuranosyl)-7-deaza-7-cyanoadenine, N⁶-methyl-9-(4-methoxy-β-D-arabinofuranosyl)-adenine, N⁶-dimethyl-9-(4-methoxy-β-D-arabinofuranosyl)-adenine, 9-(4-methoxy-β-D-arabinofuranosyl)-guanine, 9-(4-methoxy-β-D-arabinofuranosyl)-8-azaguanine, 9-(4-methoxy-β-D-arabinofuranosyl)-7-deazaguanine, 9-(4-methoxy-β-D-arabinofuranosyl)-isoguanine, 9-(4-methoxy-β-D-arabinofuranosyl)-hypoxanthine, and 9-(4-methoxy-β-D-arabinofuranosyl)-xanthine.

What is claimed is:

1. A compound selected from the group of compounds represented by the formula:

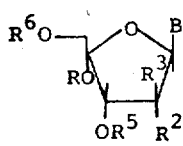

wherein

B is a pyrimidine or purine base selected from the group consisting of uracil-1-yl, 5-fluorouracil-1-yl, 5-alkyluracil-1-yl, 5-trifluoromethyluracil-1-yl, 5-nitrouracil-1-yl, 5-methylaminouracil-1-yl, 5-dimethylaminouracil-1-yl, 6-aza-uracil-1-yl, 6-aza-5methyluracil-1-yl, cytosin-1-yl, 5-fluorocytosin-1-yl, 5-alkylcytosin-1-yl, 5-trifluoromethylcytosin-1-yl, 5-nitrocytosin-1-yl, 5-methylaminocytosin-1-yl, 5-dimethylaminocytosin-1-yl, 6-azacytosin-1-yl, adenin-9-yl, 2-fluoroadenin-9-yl, 2-azaadenin-9-yl, 7-deazaadenin-9-yl, 8-azaadenin-9-yl, 8-aza-9-deazaadenin-9-yl, 7-deaza-7-cyanoadenin-9-yl, N⁶-methyladenin-9-yl, N⁶-dimethyladenin-9-yl, guanin-9-yl, 8-azaguanin-9-yl, 7-deazaguanin-9-yl, isoguanin-9-yl, hypoxanthin-9-yl and xanthin-9-yl, and hydrolyzable acyl derivatives thereof derived from a carboxylic acid having from 1 to 12 carbon atoms and wherein alkyl refers to a straight chain hydrocarbon group containing 1 to 5 carbon atoms;

R is methyl, ethyl, -CH₂CH₂X, -CH₂CH(X)₂ or -CH₂C(X)₃ and each X is Cl or F;

one of R² and R³ is hydrogen and the other is hydrogen or OR⁴; and each of R⁴, R⁵ and R⁶ are hydrogen or a hydrolyzable acyl group having 1 to 12 carbon atoms;

provided that when both R² and R³ are hydrogen, B is a pyrimidine base.

2. A compound of claim 1 wherein R is methyl.

3. A compound of claim 2 wherein B is a pyrimidine base.

4. The compound of claim 3 which is 4'-methoxyuridine.

5. The compound of claim 3 which is 4'-methoxycytidine.

6. The compound of claim 3 wherein B is 5-fluorouracil-1-yl; 1-(2-deoxy-4-methoxy-β-D-erythropentofuranosyl)-5-fluorouracil.

7. The compound of claim 3 wherein B is cytosin-1-yl; 1-(4-methoxy-β-D-arabinofuranosyl) cytosine.

8. The compound of claim 3 wherein B is a hydrolyzable benzoyl derivative of a pyrimidine base and R⁴, R⁵ and R⁶ are benzoyl groups.

9. The compound of claim 8 which is N⁴-benzoyl-1-(2,3,5-tri-O-benzoyl-4-methoxy)cytidine.

10. The compound of claim 8 which is N⁴-benzoyl-1-(2,3,5-tri-O-benzoyl-4-methoxy-β-D-arabinofuranosyl)cytosine.

11. The compound of claim 8 which is N⁴-benzoyl-1-(2,3,5-tri-O-benzoyl-4-methoxy-β-D-arabinofuranosyl)-5-fluorocytosine.

12. A compound of claim 2 wherein B is a purine base.

13. The compound of claim 12 wherein B is 8-aza-9-deazaadmin-9-yl; 4'-methoxy-8-aza-9-deazaadenosine.

14. The compound of claim 12 wherein B is 2-fluoroadenin-9-yl; 4'-methoxy-2-fluoroadenosine.

15. The compound of claim 12 which is 4'-methoxyadenosine.

16. The compound of claim 12 wherein B is N⁶-dimethyladenin-9-yl; N⁶-dimethyl-4'-methoxyadenosine.

17. The compound of claim 12 wherein B is adenin-9-yl; 9-(4-methoxy-β-D-arabinofuranosyl) adenine.

18. The compound of claim 12 in which B is a hydrolyzable benzoyl derivative of a purine base and R⁴, R⁵ and R⁶ are benzoyl groups.

19. The compound of claim 10 which is N⁶-benzoyl-9-(2,3,5-tri-O-benzoyl-4-methoxy-β-D-Arabinofuranosyl)adenine.

20. A compound selected from the group represented by the formula

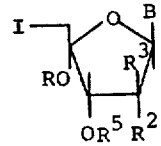

wherein

B is a pyrimidine or purine base selected from the group consisting of uracil-1-yl, 5-fluorouracil-1-yl, 5-alkyluracil-1-yl, 5-trifluoromethyluracil-1-yl, 5-nitrouracil-1-yl, 5-methylaminouracil-1-yl, 5-dimethylaminouracil-1-yl, 6-aza-uracil-1-yl, 6-aza-5-methyluracil-1-yl, cytosin-1-yl, 5-fluorocytosin-1-yl, 5-alkylcytosin-1-yl, 5-trifluoromethylcytosin-1-yl, 5-nitrocytosin-1-yl, 5-methylaminocytosin-1-yl, 5-dimethylaminocytosin-1-yl, 6-azacytosin-1-yl, adenin-9-yl, 2-fluoroadenin-9-yl, 2-azaadenin-9-yl, 7-deazaadenin-9-yl, 8-azaadenin-9-yl, 8-aza-9-deazaadenin-9-yl, 7-deaza-7-cyanoadenin-9-yl, N⁶-methyladenin-9-yl, N⁶-dimethyladenin-9-yl, guanin-9-yl, 8-azaguanin-9-yl, 7-deazaguanin-9-yl, isoguanin-9-yl, hypoxanthin-9-yl, and xanthin-9-yl, and hydrolyzable acyl derivatives thereof derived from a carboxylic acid having from 1 to 12 carbon atoms and wherein alkyl refers to a straight chain hydrocarbon group containing 1 to 5 carbon atoms;

R is methyl, ethyl, -CH₂CH₂X, CH₂CH(X)₂ or -CH₂C(X)₃ and X is Cl or F;

one of R² and R³ is hydrogen and the other is hydrogen or OR⁴; and each of R⁴, R⁵ and R⁶ are hydrogen or a hydrolyzable acyl group having 1 to 12 carbon atoms;

provided that when both R² and R³ are hydrogen, B is a pyrimidine base.

* * * * *